(12) United States Patent
Enderlin et al.

(10) Patent No.: US 11,594,919 B2
(45) Date of Patent: Feb. 28, 2023

(54) SENSOR ARRANGEMENT FOR A FOREIGN OBJECT DETECTION DEVICE

(71) Applicant: DELTA ELECTRONICS (THAILAND) PUBLIC CO., LTD ., Samutprakarn (TH)

(72) Inventors: Jonas Enderlin, Teningen (DE); Ulrich Richter, Freiburg (DE)

(73) Assignee: DELTA ELECTRONICS (THAILAND) PUBLIC CO., LTD., Samutprakarn (TH)

( * ) Notice: Subject to any disclaimer, the term of this patent is extended or adjusted under 35 U.S.C. 154(b) by 152 days.

(21) Appl. No.: 16/865,016

(22) Filed: May 1, 2020

(65) Prior Publication Data

US 2020/0350787 A1 Nov. 5, 2020

(30) Foreign Application Priority Data

May 3, 2019 (EP) ..................................... 19172545

(51) Int. Cl.
*H02J 50/60* (2016.01)
*H02J 50/12* (2016.01)
(Continued)

(52) U.S. Cl.
CPC ............ *H02J 50/60* (2016.02); *B60L 53/124* (2019.02); *G01V 3/104* (2013.01); *H01F 38/14* (2013.01); *H02J 50/12* (2016.02)

(58) Field of Classification Search
CPC ..... G01V 3/101; Y02T 10/70; Y02T 10/7072; H02J 50/60
See application file for complete search history.

(56) References Cited

U.S. PATENT DOCUMENTS 9,762,084 B2 * 9/2017 Cho ...................... H02J 50/402
9,825,486 B2 11/2017 Liu et al.
(Continued)

FOREIGN PATENT DOCUMENTS

EP          3 124 313 A1    2/2017
WO    20140206961 A2   12/2014
(Continued)

OTHER PUBLICATIONS

European Search Report dated Oct. 1, 2019, 8 pages.
European Search Report dated Jun. 8, 2021, 4 pages.

*Primary Examiner* — Dominic E Hawkins
(74) *Attorney, Agent, or Firm* — Vector IP Law Group; Robert S. Babayi

(57) ABSTRACT

The invention relates to a sensor arrangement (140) for a foreign object detection device which includes a current input (142) and a current output (143), a multitude of detection cells (144.1-144.9), each comprising a sense coil and a capacitive element, forming a resonant tank. The sensor arrangement (140) further has a multitude of inputs leads (148a-148c) and a multitude of output leads (150a-150c), the total number of input and output leads being equal or smaller than the number of detection cells (144.1-144.9). Each detection cell is connected between one of the input leads (148a-148c) and one of the output leads (150a-150c), in a way that each of the detection cells (144.1-144.9) is connected to a different pair of input and output leads (148a-148c, 150a-150c). An input selection circuit (152) allows to selectively establish an electrical connection between the current input (142) and one or more of the input leads (148a-148c) and an output selection circuit to (153) selectively establish an electrical connection between one or more of the output leads (150a-150c) and the current output (143). According to the invention at least one detection cell (144.1-144.9) includes a decoupling element (D1-D9) connected in series to its resonant tank. The invention further relates to foreign object detection device for a wireless power transfer system, a primary part of a wireless power transfer system, a wireless power transfer system and a method for detecting a foreign object.

17 Claims, 11 Drawing Sheets

(51) Int. Cl.
    *B60L 53/124*     (2019.01)
    *G01V 3/10*     (2006.01)
    *H01F 38/14*     (2006.01)

(56) References Cited

U.S. PATENT DOCUMENTS

| | | | |
|---|---|---|---|
| 9,921,045 | B2 | 3/2018 | Sieber et al. |
| 10,018,744 | B2 | 6/2018 | Roy et al. |
| 2012/0019075 | A1* | 1/2012 | Cho ................ H01F 38/14 29/605 |
| 2012/0068550 | A1* | 3/2012 | Boer ................ H02J 50/12 307/104 |
| 2014/0184154 | A1* | 7/2014 | Okazaki ........... H02J 50/12 320/108 |
| 2016/0187520 | A1 | 6/2016 | Widmer et al. |
| 2017/0163093 | A1* | 6/2017 | Akuzawa .......... H02J 50/60 |
| 2019/0327791 | A1* | 10/2019 | Baldo ............... H05B 6/1209 |

FOREIGN PATENT DOCUMENTS

| | | |
|---|---|---|
| WO | 2015/005935 A1 | 1/2015 |
| WO | 20160159788 A1 | 6/2016 |

\* cited by examiner

SENSOR ARRANGEMENT FOR A FOREIGN OBJECT DETECTION DEVICE

TECHNICAL FIELD

The invention relates to a sensor arrangement for a foreign object detection device. The sensor arrangement includes a current input and a current output, a multitude of detection cells, each comprising a sense coil and a capacitive element, forming a resonant tank. The sensor arrangement further has a multitude of input leads and a multitude of output leads, the total number of input and output leads being smaller than the number of detection cells. Each detection cell is connected between one of the input leads and one of the output leads, in a way that each of the detection cells is connected to a different pair of input and output leads. The sensor arrangement further includes an input selection circuit allowing to selectively establish an electrical connection between the current input and one or more of the input leads, and an output selection circuit allowing to selectively establish an electrical connection between one or more of the output leads and the current output.

The invention further relates to a foreign object detection device for a wireless power transfer system, a primary part of a wireless power transfer system, a wireless power transfer system and a method for detecting a foreign object.

BACKGROUND ART

Wireless power transfer is now widely used for charging mobile devices or electrical vehicles, but there are also many other applications, for instance to transfer power to industrial machinery, robots or for powering biomedical devices. The technology of the wireless power transmission can eliminate the use of the wires and batteries, thus it increases the mobility of the electronic devices. It is more convenient and safer for all users.

The power classes of wireless charging systems have a wide spectrum with an output power between a 1 W and several 100 KW. A problem in such devices is that it is generally not possible to mechanically prevent foreign objects, in particular objects made of metal, from being placed into proximity of the primary unit and/or the secondary unit of a wireless power transfer system respectively between the primary and the secondary unit. Such foreign objects may comprise a coin, a key, a tool, a can and other objects. Especially magnetic and conductive objects can heat up in a magnetic field quickly by induced eddy currents, which are electrical current loops caused by a changing magnetic field in the foreign object due to Faraday's induction law. This unintentional conversion of electrical energy into heat energy causes additional losses and is a danger for the wireless energy transfer system and a human or an animal being in its environment. Due to the physical law, it is not possible to avoid these eddy currents and the resulting heating. It is therefore all the more important to recognize the presence of objects with suitable means and methods and thus to counteract the dangers.

There are already various approaches to solve this problem. In some cases, a curved shape of the transmitting pad ensures that the objects move from the pad with the help of gravity. Another approach is to use sensors to detect the presence of metallic objects. For instance, capacitive sensors and optical sensors can be used, but they can easily be disturbed by environmental influences and non-metallic objects. Inductive sensors are more commonly used, because they are robust against environmental influences such as dirt and provide precise results in the near range at the same time. One kind of inductive sensors detects the reduction of the inductance of a coil due to induced eddy currents in the object to be detected, which counteract the primary field of the coil. With the finite conductivity of the object, also ohmic losses occur, which also may be detected. For the evaluation of these changes, several methods have been established in the state of the art, which are also used in the prior art stated below. It is well known to use arrays of sensor coils in order to increase the detection area while achieving a sufficient detection sensitivity.

U.S. Pat. No. 9,825,486 B2 for instance discloses a wireless power charging system for charging a separate device. This system includes a coil array in a single or multiple layer to detect the presence of an "unfriendly" foreign object. The foreign objects are detected using the principle of decay in a resonant circuit. The array may comprise planar circular or rectangular coils, preferably arranged on the top of a power transmitter coil. The size of the detection coils is chosen to be similar to the size of the target foreign object. The array also may be used to detect the location of the foreign object.

Another system for detecting of an object in an environment of a wireless charging device is described in U.S. Pat. No. 10,018,744 B2. The system thereto comprises a detector including multiple loops of conductive material in at least a first plane, which can be connected to a readout circuit. It may detect an object based on the amplitude or phase change in waveforms. The voltage on all cons may be measured in sequence or multiplexed in a way that allows fewer read-out amplifiers. In certain embodiments, an auxiliary coil can be used to generate a magnetic field, and perturbations to the auxiliary magnetic field are then detected by a detector array to ascertain the presence of foreign objects.

The WO 2016/159788 discloses an inductive power transmitter (IPT) for inductive power transfer. The disclosed IPT includes an object detection system, which is configured to detect the presence of an object based on a change in energy or frequency in a detection_circuit. The object detection system generates a field, which has a significantly lower or higher frequency than the IPT and therefore can be operated sequentially or simultaneously with the IPT. The IPT transmitter can use the IPT coils for object detection or separate coils. For each detection coil a separate switch is required.

The WO 2014/206961 discloses a further object detection system with LC circuits in an array- or matrix-like arrangement. The windings are part of LC circuits, which in a certain embodiment are driven separately by a common driving circuit, wherein the LC circuits are connected to the output side of a driving switch via a switching element. The presence of a foreign object is detected by means of an increase in an input power to the driving circuit.

Also U.S. Pat. No. 9,921,045 B2 discloses a detection circuit. It comprises densely packed wire loops that cover an area in which metal objects may be detected. The circuit includes a multiplexer and a resonant frequency measurement unit. The multiplexer selects the loops sequentially and periodically and the frequency measurement unit determines the resonant frequency of those loops. In order to increase detection sensitivity, parameters of adjacent loops are also considered.

With the increasing size of the detection arrays, the hardware effort of the detection system becomes more and more important. It is also crucial, that despite the increasing size of the detection arrays the detection accuracy is maintained.

As shown above, it is known in the prior art to tackle the problem of the increasing hardware effort by the use of a common excitation and evaluation circuit common to all detection cells in combination with the use of multiplexers. The known arrangements however still have drawbacks in respect to detection accuracy, in particular due to cross talk between adjacent detection cells. The prior art, e.g. U.S. Pat. No. 9,921,045 B2 partly overcomes this drawbacks, by applying advanced detection algorithms, which however requires more calculation power and more hardware.

SUMMARY OF THE INVENTION

It is therefore an object of the invention to provide a sensor arrangement for a foreign object detection device for a wireless power transfer system pertaining to the technical field initially mentioned, which provides reduced hardware costs with an increased detection accuracy. It is further an object of the invention, to provide a foreign object detection device for a wireless power transfer system, a primary part of a wireless power transfer system and a wireless power transfer system including said sensor arrangement and further a method of foreign object detection using an inventive device.

The solution of the invention is specified by the features of claim 1. According to the invention, at least one detection cell includes a decoupling element connected in series to its resonant tank.

The solution of the invention is further specified by a foreign object detection device (FOD), which includes, besides the inventive sensor arrangement, a stimulus circuit for generating a predetermined stimulation signal, connected to a current input of the sensor arrangement, wherein the predefined stimulation signal is preferably a rectangular pulse. The FOD further includes a measurement unit, adapted to sense an electrical signal applied to said current input, wherein the measurement unit includes an analogue to digital converter for acquiring sampling data representing the sensed electrical signal. The FOD also includes a signal-processing unit, which is configured to determine time response data of a selected detection cell, based on sampling data acquired by the measurement unit. It is further preferred, that the measurement unit includes a filter for filtering the electrical signal.

The solution of the invention is further solved by a method for detecting an object by using the inventive device, which includes the following steps:
a) selecting a detection cell by means of the input selection circuit and the output selection circuit,
b) generating a stimulation signal with the stimulation unit, to excite an oscillation in the selected detection cell, the stimulation signal preferably being a rectangular pulse,
c) sampling with the measurement unit an electrical signal representing the excited oscillation in the selected detection cell,
d) determine time response data of the selected detection cell by means of the signal processing unit, based on the samples acquired in step c),
e) based on the time response data determined in step d), decide by means of a signal processing unit, if a foreign object is present close to the selected detection cell,
f) repeating the steps a-e, for other detection cells, preferably for all other detection cells.

By the invention, a high detection accuracy is achieved with a reduced hardware effort.

The hardware effort is reduced because each resonant tank can be stimulated separately with a common power source and evaluated with a common evaluation unit, while the required number of selection switches is smaller than the number of detection cells, if there are more than four detection cells. The hardware effort required to select the detection cells links proportionally to the total number of input leads and output leads, which is equal or smaller than the total number of detection cells.

Preferably the number of detection cells is greater than four and the total number of input leads and output leads is smaller than the number of detection cells.

In an advantageous embodiment the number of detection cells is greater or equal than nine, more preferably equal or greater than 25 or even more preferably equal or greater than 100. An embodiment of a sensor arrangement may for instance include 30 detection cells which are grouped in a first block of 21 detection cells with 3 input leads and 7 output leads and a second block of 9 detection cells with 3 input leads and 3 outputs leads. The total number of input and output leads of the first block being 10 and the total number of input leads and output leads being 6, which yields to altogether to 16 input and output leads.

It is further preferred, that the number of detection cells is equal to the product of the number of input leads and the number of output leads, in particular equal or greater than 9, more preferably equal or greater than 25 or oven more preferably equal or greater than 100. If for instance the number of detection cells is 21, then it is preferred, that the number of input leads is 3 and the number of output leads is 7, and the total number of input leads and output leads is 10.

It is particularly preferred, that the number of input leads and the number of output leads are the same. For example, there are 5 input leads and 5 output leads, which means that the total number of input leads and output leads is 10.

The detections cells of the inventive sensor arrangement can be selected sequentially by means of the input and output selection circuit. The resonant tank of the selected detection cell can be stimulated by means of a stimulus signal to generate an oscillating electrical signal, which allows determining if an object is present in proximity to the sense coil of the selected detection cell.

The decoupling element of a detection cell which is connected in series to the resonant tank of the respective detection cell prevents or at least restricts parasite currents via its resonant tank, in at least one direction. These parasite currents are currents which are caused by the stimulation unit, in another detection cell than the selected cell. Hence, due to the decoupling element the detection cell comprising the decoupling element does not or does less contribute to a change of a parameter, describing the stimulated oscillating electrical signal in a selected detection cell, such as the amplitude, the frequency, the shift or the decay of the oscillating signal. It is preferred that more than one detection cell includes a decoupling element in series to its resonant tank.

It is even more preferred, that each detection cell includes a decoupling element connected in series to its resonant tank. Thus, the stimulated oscillating electrical signal of a specific cell is only a function of the resonant tank of the selected detection cell and the presence of the object to be detected. This allows achieving an improved detection accuracy.

In the context of this application, a wireless power transfer system is a system that allows power transfer without wires as a physical link across a space via a time-varying electromagnetic field. The power transfer system includes a primary part as transmitter device, driven by electric power from a power source, which generates the electromagnetic field, and a secondary part as a receiver device, which extracts power from the field and supplies it to an electrical load. In a particular form, the wireless power transfer system is an inductive power transfer system.

The electromagnetic field, which is here referred to as power transfer field, at least partially consists of the primary field, which is the electromagnetic field of the primary part if no secondary part and no foreign object is located in proximity to the primary part field. If a secondary part is located within the proximity, e.g. above, the primary part, the power transfer field results from the superposition of the primary field and the secondary field, wherein the secondary field is generated by the secondary part. The form of the power transfer filed is strongly dependent on the arrangement of the secondary part in respect to the primary part and also from the currents in the primary and the secondary windings and therewith from the transferred power.

In the context of this application, a foreign object is defined as any electrical conductive and/or a magnetic object, in particular any metallic object that is positioned in proximity to a wireless power transfer system, but which is not part of it and which might induce losses to the power transfer of the power transfer system.

We designate as "active area" an area through which a major portion of the magnetic flux lines of the primary field would extend when the primary part is powered with its nominal current and frequency, in the absence of the secondary part and foreign objects. A major portion can be for instance 10%, 25%, 50%, 75%, 80%, 90%, 95% or 99% of the total magnetic flux. The active area defines a region in which proximity a secondary has to be placed to transfer power. For wireless charging applications the active area may also be designated as "charging area".

In a similar way we use the term "power transfer area" for the area through which a major portion of the magnetic flux lines of the primary field would extend for the case when a secondary part is arranged in its nominal position but when no power is transferred through the air gap between the primary part and the secondary part. In other words, the active area and the power transfer area define surfaces in the space close to the primary part, which are exposed to the magnetic field of the primary part.

In the context of this application, a decoupling element of a detection cell is a means which is configured to at least partly restrict a current flow through a detection cell, in at least one direction.

In the context of the application, we understand under "time response data of a selected detection cell" a set of data representing the time response of a selected detection cell due to a predefined stimulation signal, wherein the time response data is obtained based on sampling data of the electrical signal representing the excited oscillation of a selected detection cell.

This data may simply include raw sampling data of the electrical signal representing the excited oscillation due to the predetermined stimulation signal, acquired by means of the analogue to digital converter of the FOD for a selected detection cell. The data may also include values obtained after applying digital processing steps to the raw sampling data, such as downsampling, upsampling, scaling, filtering, data compression, applying correlation functions, parameter idendification etc. This list is not exclusive. The time response data of a selected detection cell may in particular include a single parameter, such as the serial impedance of a detection cell, a relative change of the serial impedance of a selected detection cell, a decay rate, a change in a decay rate, a resonant frequency or a change in the resonant frequency. The time response data may also include a combination of such parameters.

In a preferred embodiment of the sensor arrangement, the sense coils are arranged in a regular pattern, preferably in a matrix-like structure with multiple rows and columns.

The geometry of a winding structure of a sense coil of a detection cell defines the detection area wherein an object can be detected by means of the respective detection cell. The detection area of a sense coil is strongly related to the area encircled by the windings of the sense coil, respectively by the outer size of the coil. The total detection area of the sensor arrangement is a function of the detection areas of all sense coils. By arranging the sense coils next to each other, the total detection area can be increased. It is preferred that the sense coils are arranged in a regular pattern, in a way that winding centres are arranged in respect to each other in predetermined longitudinal and/or lateral distances. However, the sense coils can be arranged in a non-regular structure, wherein the winding centres are arranged in respect to each other in a way that their longitudinal and/or the lateral distances may variate. Such an arrangement may be advantageous if the sensor arrangement has to be applied in a wireless power transfer system wherein the power transmission field is strongly non-uniform.

It is particularly preferred that the sense coils, which are arranged in a regular pattern, have the same size and form. However, it also possible, that the sense coils which are arranged in a regular pattern have different sizes, in particular two different sizes, which are arranged in an interleaved manner.

A regular pattern in a matrix like-structure is particular advantageous, in particular if the rows and column are arranged in a way that the lines connecting the centres of the sense coils, which are arranged in a row, and the lines connecting the centres of the sense coils, which are arranged in a line, are perpendicular to each other. However, in some cases it may be advantageous if these lines are arranged in a non-perpendicular manner. Such an arrangement may be advantageous in the case if the total detection area has an essentially rhombic outer shape.

A preferred embodiment of the invention comprises five or more rows and/or five or more columns, or particularly 10 or more rows and/or 10 or more columns, or even more particularly 20 or more rows and/or 20 or more columns. With an increasing number of detection cells, the advantages of the invention are going to be achieved even better.

It is further preferred that the sense coils are arranged in one or more layers, wherein the sense coils of the different layers preferable laterally overlap each other and/or have different sizes.

By arranging the sense coils in a single layer, a large total detection area can be covered by the sensor arrangement with a minimum number of sense coils. In addition, a flat structure can be realized. The sense coils can for instance be arranged on a flat support structure, such as a plate made out of non-electrical material, a single PCB or also on a flexible foil e.g. by vapour deposition.

The sense coils can also be installed in recessions of a support structure.

In this application we designate a flat support structure including the sense coils as sense coil mat or sense coil plate, wherein flat means, that the thickness of the mat respectively the plate is smaller than five times of its largest lateral extension.

The sense coils of a single layer preferably do not overlap each other. In dependence of the outer shape of the sense coils and the position of the centres of the sense coils, there are interspaces between the sense coils, wherein the detection sensitivity may be decreased or where even no detection is possible, yielding to blind spots.

If sense coils are arranged in more than one layer, e.g. in a first and in a second layer, the sense coils of the different layers are preferable arranged in a way that at least one of the sense coils of one layer, e.g. the first layer, overlaps a sense coil of another layer, e.g. the second layer. It may be advantageous, that more than one sense coil of one layer is overlapping with a sense coil of another layer or that each sense coil of one layer is overlapping with a sense coil of another layer.

Due to an overlapping arrangement of sense coils, interspaces with a decreased detection sensitivity can be avoided. This increases the coverage of the total detection area and may provide a higher and a more uniform detection sensitivity, in particular, if the sense coils are arranged in a similar regular shape in the different layers.

In a preferred embodiment, the distances between the sense coils in different layers are the same in longitudinal and/or lateral direction. It is further preferred, that the sense coils in the different layers are displaced in a longitudinal and/or a lateral distance in respect to each other, the longitudinal and/or lateral displacement distance being related to distance between the centres of the single layers. Preferably, the displacement distance in longitudinal and/or lateral direction is the distance between the sense coils of a single layer in the respective direction divided by the total number of layers. In this way, a very uniform detection sensitivity can be achieved. For example, in the case of two similar layers, the second layer may be longitudinally and laterally displaced by half of the distance between the centres of the sense coils in those directions.

Advantageously the sense coils of two layers, for instance a first and a second layer, are arranged in a way that one layer, for instance the first layer, is arranged on a first surface of a support structure and another layer, for instance the second layer, is arranged on a second surface of the support structure. The support structure can also comprise recesses for receiving the sense coils of at least one layer.

In some cases, it might be advantageous to integrate all layers in a simple structure, e.g. by casting the sense coils of different layers in an epoxy resin.

In a preferred embodiment, the support structure is a multi-layer PCB and the sense coil layers are realized by traces belonging to different layers of the PCB.

It may also be advantageous to arrange the sense coils in more than one layer, in a way that they do not overlap. This might facilitate the connections between the sense coils and the input and the output leads.

The other components of the sensor arrangement can also be placed on the support structure respectively integrated in the sense coil mat, namely the input- and/or output selection circuit and/or at least a capacitive element of one resonant tank, preferably of all resonant tanks. Preferably, the capacitive element and the sense coil belonging to the same resonant tank are arranged in proximity to each other. This allows for reducing the wiring effort and minimises crosstalk between the detection cells.

In a preferred embodiment, at least one sense coil has a spiral shape, wherein neighboured turns of the sense coils have a distance above 0.1 mm, in particular between 1 mm and 25 mm, and even more preferably between 2 mm and 10 mm.

It is preferred, that the sense coils have more than one winding turn. By increasing the number of winding turns, the inductivity of the sense coil and its sensitivity can be increased. A spiral shape allows implementing low profile sense coils with more than one turn by means of a single conducting layer, e.g. by applying printed spiral windings on a PCB.

The spiral shaped windings have typically a flat shape.

The sensitivity of spiral shaped sense coils is less dependent on the size of the foreign objects. Hence, a sensor arrangement with spiral sense coils allows detecting foreign object of different sizes more reliably.

In addition, spiral shaped sense coils tend to be less sensitive to a lateral or longitudinal displacement of the foreign object to be detected, what leads to a more uniform detection sensitivity along the total detection surface defined by the sense coils of the sensor arrangement.

It is further preferred, that the sense coils have a rectangular, preferably a square outer shape, the size of the sense coils being adapted to the size of the foreign object to be detected.

The detection area of a sense coil preferably covers a surface between 100-22500 $mm^2$, more preferably between 400 and 14400 $mm^2$ and even more preferably between 600 $mm^2$ and 10000 $mm^2$.

The outer shape of the sense coils determines the shape of the detection area of a sense coil. Thus, a sense coil with a rectangular outer shape has a rectangular-shaped detection area, respectively a sense coil with a squared outer shape has a squared shaped detection area. A rectangular respectively a square outer shape allows to arrange neighboured sense coils close to each other, and thus to achieve a detection area with only small interspaces, compared for instance with round-shaped sense coils. On the other hand, rectangular-shaped sense coils can be arranged in a matrix-like structure. A matrix-like structure with equidistantly arranged sense coils having a square outer shape has the advantage that a similar sensitivity can be achieved in the direction of the rows and the direction of the columns. In this way, the orientation of a longitudinal foreign object has a lower influence on the detection accuracy.

The sense-coils can also have a triangular, a hexagonal or a round outer shape. Also a triangular or hexagonal outer-shape allows obtaining a single layer arrangement with reduced interspaces.

If the hexagonal-shaped sense coils are arranged to form a honeycomb structure, a detection area can be achieved, which has a high sensitivity over the whole detection area.

Sense coils with a round outer shape may in particular be advantageous if the sense coils are arranged in different layers, in a way that sense coils of different layers overlap each other, in order to avoid interspaces where only a low sensitivity is achieved. Round shaped sense coils may be easier to manufacture.

The size of the sense coils is preferably to be adapted to the size, the shape, the material and/or the form of the foreign objects to be detected. As a rule, smaller sense coils may offer an increased sensitivity to smaller objects. However, smaller detection coils requires more connection effort and imply a smaller detection distance.

The choice of the size of the sense coils and/also the shape of the sense coils preferably considers the required detection sensitivity, the required total detection surface of the sensor arrangement, the detection distance, and also the different possible foreign objects to be detected, such as cans, coins, tools etc.

It is further advantageous, that a resonant frequency of the resonant tank of at least one sense coil is above 10 kHz, preferably above 100 kHz and even more preferably above 400 kHz, when no foreign object is arranged in proximity to the respective sense coil.

In an embodiment the resonant frequencies of all resonant tanks are above 10 kHz, more preferably above 100 kHz and even more preferable above 400 kHz.

Experiments have shown that a stable detection of a foreign object, based on a change of a serial inductance due to eddy currents can be achieved at a frequency of 10 kHz or above. Though at this frequency the detection sensitivity is still strongly dependent on the material of the foreign object to be detected, it is possible to securely detect objects made of many conductive materials, for instance objects made of stainless steel and galvanized iron. From about above 100 kHz the influence of the material of the foreign object to be detected on a change of serial inductance is strongly reduced, and above 400 kHz almost negligible.

With a higher resonant frequency, the detection sensitivity increases, as the influence of eddy currents grows with increasing frequency, which means an enlargement in the change of the series inductance. Above 400 kHz the dependency of the series inductance in respect of the material of the foreign object to be detected almost disappears.

With frequencies higher than 400 kHz, e.g. 800-900 kHz even better results can be achieved.

It is however also preferred that the resonant frequency is 5 MHz or below, preferably below 2 MHz and even more preferably below 1 MHz, when no foreign object is arranged in proximity to the respective sense coil.

Namely, the required sampling rate for a later evaluation with Analogue-to-Digital Converter (ADC) increases with the resonant frequency respectively the detection frequency. The sampling rate and therewith also the detection frequency should therefore be as low as possible. For manufacturers of ADCs a sampling rate of 10 MHz represents a barrier into the high-frequency range and thus into another price range for the ADCs. This means, that for sampling rates above 10 MHz costs for ADCs tend to increase more rapidly. Conversely, this means that the sampling rate should be well below 10 MHz and therefore the maximum detection frequency well below 5 MHz due to the Nyquist-Shannon sampling theorem. With a detection frequency below 1 MHz or even with 900 KHz costs can be further reduced while still maintaining a high detection sensitivity.

The resonant frequency is advantageously adapted to a transmission frequency of the power transfer field. In order to allow foreign object detection when the primary part is activated and in particular during power transmission, the resonant frequency should be preferable multiple times higher or lower than the transmission frequency of the power transfer, more preferable multiple times higher. The distance of the resonant frequency from the transmission frequency should be even more preferably at least one decade. The transmission frequency in inductive power transfer applications is typically in the range of some tens of kilohertz, e.g. 45 kHz.

In a preferred embodiment of the sensor arrangement, said one decoupling element includes a non-controlled reverse current blocking element, the blocking element preferably being a diode, in particular a PN-junction diode or a Schottky diode.

By using non-controlled reverse current blocking elements, additional control lines are avoided and the control effort can be minimized.

A decoupling element may be considered as reverse current blocking element if it comprises a voltage region in reverse direction with a significantly increased resistance, wherein the voltage regions lies in the range of the expected voltages during normal operation. A resistance is considered as significantly increased if it is at least 2 times, preferably 5 times and even more preferably 10 times higher in the reverse direction as in the corresponding voltage region of the forward direction. Such an element can for instance be a Zener diode, having a low resistance in the breakdown region, it the breakdown voltage is chosen to be above the expected operation voltage.

A reverse current blocking element is also considered non-controlled, if it has in addition to an input and an output terminal a configuration terminal, which allows to adapt or configure the current-voltage characteristics of the component, as long as the input to the configuration terminal is connected to an essentially constant signal reference.

Rectifier diodes are preferred elements because they are very simple and robust elements. In particular, PN-junction, PIN-junction and Schottky diodes are preferred rectifier elements. Other reverse current blocking elements may include PNP- or NPN Bipolar transistors. They may be connected with their collector and their base in series to the resonant tank, while the emitter may remain unconnected. In addition, N- or P-Channel FET can be advantageously used. They allow achieving a very low threshold voltage in the forward path. The FET can be installed in the reverse orientation, as it would normally be used. This direction is so that the slight leakage current through the FET's intrinsic body diode will bias the FET on when the polarity is correct and block current when reversed, thus shutting off the FET.

In an advantageous embodiment, the input selection circuit includes a first multiplexer unit and/or the output selection circuit includes a second multiplexer unit.

A multiplexer unit is considered either a multiplexer or a demultiplexer. Preferably, the multiplexer units are analogue multiplexers. The first multiplexer is preferably an analogue demultiplexer and the second multiplexer an analogue multiplexer.

The first multiplexer unit allows connecting exactly one of the input leads to the current input of the sensor arrangement and/or the second multiplexer unit allows connecting exactly one of the output leads to the current output of the sensor arrangement.

In another embodiment, the input selection circuit includes a single switch per input lead and the output selection circuit a single switch per output lead. This has the advantage that more than a single detection cell can be selected at the same time.

It is also preferred, that the sense coil and the capacitive element of each detection cells are connected in parallel to form a parallel resonant tank.

In another embodiment, the sense coil and the capacitive element of each detection cell are connected in series to form a series resonant tank.

A sensor arrangement using parallel tanks has the advantage that it can be stimulated by a current source. The sensed electrical signal is preferably a voltage. This is because the stimulation signal leads to an oscillating voltage on the terminals of a selected resonant tank respectively of a selected detection cell and therewith across the current input and current output of the sensor arrangement. This oscillating voltage can be directly be measured with an ADC without using an additional shunt resistor or a hall sensor.

It is expected that detection cells with parallel resonant tanks are about 10% more sensitive than detection cells with series resonant tanks.

A sensor arrangement using series resonant tank on the contrary is preferably stimulated with a voltage source. The sensed electrical signal is preferably a current and hence evaluated by means of a current sensing means.

The inventive foreign object detection device (FOD) for a wireless power transfer system includes an inventive sensor arrangement, a stimulus circuit for generating a predetermined stimulation signal, connected to a current input of the sensor arrangement, the predefined stimulation signal preferably being a rectangular pulse. The FOD further includes a measurement unit, adapted to sense an electrical signal applied to said current input, wherein the measurement unit includes an analogue to digital converter for acquiring sampling data representing the sensed electrical signal. The FOD also includes, a signal processing unit which is configured to determine time response data of a selected detection cell, based on the sampling data acquired by the measurement unit, wherein the measurement unit preferably includes a filter for filtering the electrical signal.

The inventive foreign object detection device inherits all the advantages of the inventive sensor arrangement.

The signal processing unit is preferably further adapted to decide if a foreign object is present close to a selected detection cell based on the determined time response data of the respective detection cell.

The time response data of a selected detection cell, which can be determined by means of the signal processing unit, is preferably dependent on a series impedance of said selected detection cell.

The predetermined stimulation signal is required to excite respective stimulate the resonant tank. The stimulation signal preferable comprises a DC component, and more preferably, it is unipolar. The DC component of the stimulation signal improves the effect of the decoupling element.

A predetermined stimulation signal can be either a deterministic signal or a signal having a predefined noise spectrum. Deterministic signals are easier to be generated.

A signal having a rectangular shape is particularly easy to be generated, namely by means of a switch. However also other deterministic stimulation signals are possible, e.g. stimulation signals having a single pulse. By the length, amplitude and the shape of the pulse not only the amplitude of the excited electrical signal can be adapted to the input range of the measurement unit, but also the frequency spectrum of the stimulation signal to the expected resonant frequencies of the resonant tanks of the detection cells, in presence or in absence of a foreign object. Therefore other shapes than a rectangular one are possible, such as a triangular shape.

In some cases a noise signal having a predefined frequency spectrum may be advantageous, such as a pseudo-random noise signal, in particular a pseudo-random-signal approximating a white noise signal.

The detection cell of which the time response data is to be determined is selectable by means of the input and output selection circuit. The inventive FOD only requires one stimulation unit, one measurement unit and one signal processing, for the multitude of the detection cells.

The determined time response data of a detection cell may include any data representing the time response of the electrical signal due to the stimulation of the detection cell. The time response is typically an oscillating signal with a decay rate, if the stimulation signal has the shape of a step respectively has a rectangular shape.

The time response data which can be determined by means of the signal processing unit may in particular include a parameter dependent on the series impedance of the selected detection cell, such as the decay rate, the frequency, the quality factor of the resonant circuit respectively the resonant tank, the maximal magnitude, in particular at a certain time. The parameter may also be a change of the series impedance of the resonant circuit. As the series impedance is a complex value, the change may be a change in magnitude and/or in the phase of the series impedance. A change in the series impedance may include a change in a series inductance, a series resistance and/or a series capacitance. Preferably, the parameter may also be another parameter related to the time response, such as an average value of the signal, a sum of the signal samples, and also a result of a correlation with a reference signal.

Preferably, the FOD also includes a data storage for storing the acquired sampling data and/or the time response data.

In a preferred embodiment, the stimulation unit includes a current source and preferably at least one switching means. A switching means can also be provided by the input and/or the output selection circuit.

An inventive primary part for a wireless power transfer system for transferring power over an air gap to a nearby receiver is configured to generate a magnetic field in an active area at a transmission frequency. The primary part includes the inventive sensor arrangement and/or the inventive foreign object detection device. The sense coils are arranged in a way that a sensing area defined by the sense coils at least partly covers the active area. Preferably the sensing area entirely covers the active area.

The sense coils are preferably arranged on the surface of the primary part, more preferably the sense coils are arranged with the support structure on an outer surface of an enclosure of the primary part or on an inner surface of the enclosure of the primary part. In a further preferred embodiment, the support structure is part of the enclosure. In a particular embodiment, the support structure with the sense coils is a sense coil mat or sense coil plate.

In a preferred embodiment the primary part is a primary part for an inductive power transfer system and comprises at least one transmitter coil and advantageously also a ferrite core.

A further aspect of the invention relates to a secondary part for a wireless power transfer system for transferring power over an air gap to a nearby receiver. The secondary part is configured to receive a magnetic field in an active area at a transmission frequency. The secondary part includes the inventive sensor arrangement and/or the inventive foreign object detection device. The sense coils are arranged in a way that a sensing area defined by the sense coils at least partly covers the active area. Preferably, the sensing area entirely covers the active area.

The sense coils are preferably arranged on the surface of the secondary part, more preferably the sense coils are arranged with the support structure on an outer surface of an enclosure of the secondary part or on an inner surface of the enclosure of the secondary part. In a further preferred embodiment, the support structure is part of the enclosure of the secondary part.

In a particular embodiment of the primary part and/or the secondary part, the support structure with the sense coils is a sense coil mat or sense coil plate.

In a preferred embodiment the primary part is a primary part for an inductive power transfer system and comprises at least one transmitter coil and advantageously also a ferrite core.

In a preferred embodiment the secondary part is a secondary part for an inductive power transfer system and comprises at least one receiver coil and advantageously also a ferrite core.

In a preferred embodiment the primary part is configured to adapt a current of a transmission coil of the primary part, when a foreign object is detected by the object detection device It is particularly preferred that the mode of operation of the primary part is adapted to reduce power losses in the presence of a foreign object. In particular, the current in the transmission coil can be reduced, switched off and/or switching on of the current can be prevented, in order to avoid power losses in the detected foreign object and/or that the foreign object is heated up. In some cases, it might also be possible to move the transmission frequency, in particular lowering the transmission frequency to reduce eddy current losses in the foreign object. It is further preferred that in the case that the primary part includes separate coils respectively separate active areas, that the currents of the different coils respectively areas are adapted in function of the position of the detected foreign object.

An inventive wireless power transfer system includes an inventive primary part and a secondary part, wherein the wireless power transfer system is configured to wirelessly transfer electrical power from the primary part to the secondary part over an air gap and wherein the sense coils are at least partly arranged in the air gap between the primary part and the secondary part.

In a preferred embodiment, the wireless power transfer system is an inductive power transfer system, the primary part of the wireless transformer including a transmitter coil and the secondary part including a receiver coil. Preferably, also the secondary part includes a ferrite core.

In the inventive method for detecting a foreign object, the time response data of a detection cell is preferably dependent on the series impedance of the detection cell. The step of determining the time response data may also include a step of storing samples of the electrical signals sampled with the measurement unit and/or of storing the time response data of the selected detection cell.

In a preferred embodiment of the inventive method, the electrical signal is continuously acquired during the consecutive execution of steps a)-c) of claim 13 for more than one cell, before the steps d) to f) of claim 13 are executed for each of said detection cells, wherein preferably step d) includes reducing a phase shift between the stimulation signal and the sampled electrical signal representing the excited oscillation in the selected detection cell. The phase shift is in particular reduced by determining a cross-correlation between the stimulation signal and said sampled electrical signal representing the excited oscillation in the selected detection cell.

The individual time responses for the different detection cells can be determined by subdividing the acquired samples of the electrical signal in different time frames for the different detection cells. By determining a cross-correlation between the stimulation signal and the sampled electrical signal of a single time frame related to a detection cell, time jitter due to the discrete sampling intervals can be reduced.

The determination of the time response data after samples from more than one detection cell have been acquired allows very efficiently processing the acquired samples and timely decoupling the data acquisition from the signal processing.

Comparing or correlating time response data of more than one detection cell allows to better eliminate environmental influences.

In another preferred embodiment of the inventive method the decision if a foreign object is present close to a specific detection cell is made based on a comparison of the time response data with reference data specific to the respective detection cell, wherein the reference data specific to the detection cell preferably is continuously adjusted to consider environmental influences.

A change of the time response data between two measurements can for instance be caused by a change in temperature or by the aging of components of the sensor arrangement. Typically a variation in temperature or the effect of aging, which for instance yields to a variation of a capacitance, an inductance or a resistance, causes a gradual change or drift of the time response data, while the presence of a foreign object causes an essentially immediate change of the time response. This allows to distinguish a drift in the time response data between consecutive measurements due to such environmental changes from the change in the time response data between consecutive measurements due to the presence of a foreign object.

A temperature change can for instance be caused by ohmic losses in the sensor arrangement but also by a changing ambient temperature and solar radiation.

Advantageously the reference data may be directly based on previously determined time response data, gained for instance from data samples acquired during a calibration measurement. It is even more preferred that the reference data is based on time response data gained during more than one detection loops. Preferably, the reference data of a specific detection cell is iteratively adapted. The reference data may include a single parameter, in particular if the time response data also only consists in a single parameter.

The reference data can however also be based on predefined data values, e.g. on factory set values. The reference data is advantageously considering the reference data of other detection cells.

It is preferred, that each detection cell has its own specific reference data. In a further preferred embodiment, specific reference data can be common to two or more detection cells, which allows dissolving the total detection area respectively the monitoring area into small zones. It however might be advantageous, if all detection cells share a common set of reference data, which reduces the calculation effort.

This is particularly advantageous, if the drift of the reference data between consecutive measurements is similar to all detection coils. Possible causes for such a homogeneous drift can be a change in ambient temperature or the above mentioned aging of components of the sensor arrangement.

Using previously determined reference data to determine new reference data reduces the calculation effort. If the determination of the reference data is based directly on sampled data, more evaluated calculation algorithms can be used.

Considering previously determined time response data, e.g. parameters, and/or previously acquired sampling data allows a more holistic view of the acquired sampling data and/or to perform plausibility checks and/or to make adjustments to limit values caused by environmental changes.

Other advantageous embodiments and combinations of features come out from the detailed description below and the entirety of the claims.

BRIEF DESCRIPTION OF THE DRAWINGS

The drawings used to explain the embodiments show:

FIG. 7b a side view of the primary part of the wireless transfer system shown in FIG. 7a;

In the figures, the same components are given the same reference symbols.

Preferred Embodiments

Figure 1:
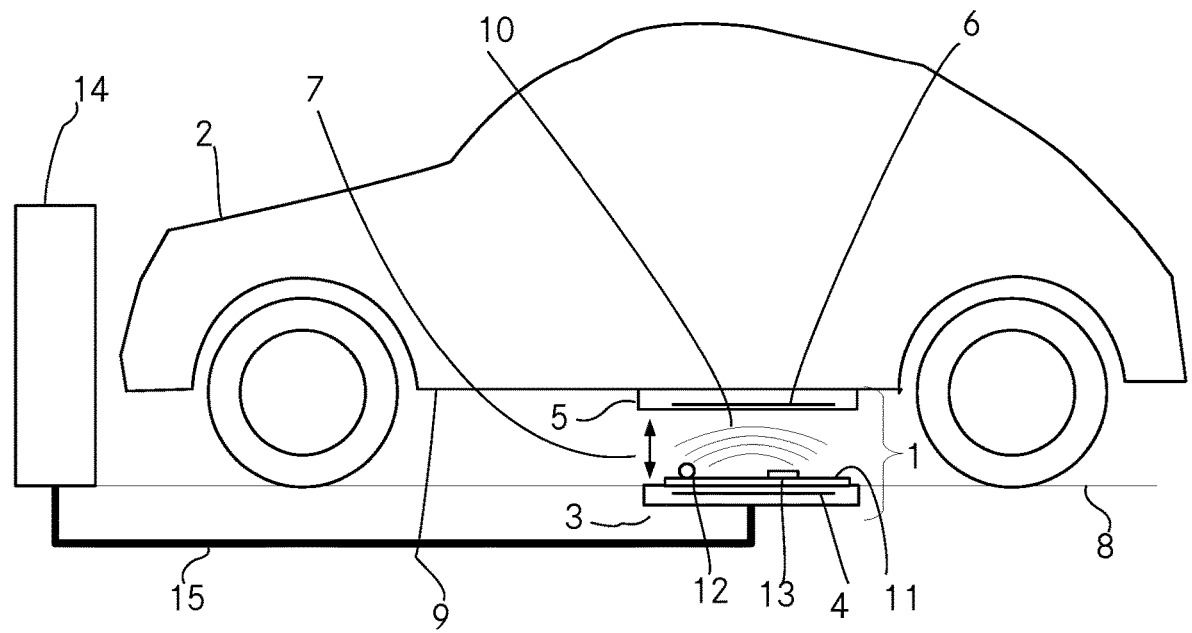
FIG. 1 a schematic side view of an inventive wireless power transfer system for charging an electrical vehicle.

FIG. 1 shows a schematic side view of an inventive wireless power transfer system for charging an electrical vehicle. The wireless power transfer system 1 allows wireless charging of an electrical vehicle 2 while the vehicle is parked.

The wireless power transfer system 1 includes a primary part 3 and a secondary part 5.

A transmission coil 4 in the primary part 3 forms together with a capacitor (not shown) a primary resonator. A receiver coil 6 in the secondary part 5 forms a second resonator together with another capacitor. The primary part 2 and the secondary part 3 are arranged in a certain distance above each other, such that they are separated by an air gap 7. The distance respectively the air gap between the primary and the secondary part for wireless charging system of vehicles lies in the range of 2-30 cm. While the relatively large airgap involves a reduced coupling coefficient between the primary part and the secondary part, it has the advantage that the presence of the secondary part has almost not negatively affect the foreign object detection.

In the embodiment, the primary part 3 is integrated in the floor 8 and the secondary part 5 is arranged underneath the vehicle floor 9, opposite to the primary part 3. While in the present example primary part 3 is completely integrated in the garage floor 8, it is also possible that the primary part is arranged on the garage floor 8 or only partly in the garage floor 8.

The primary resonator and the secondary resonator are tuned to a common resonant frequency to efficiently transfer power from the primary part 3 to the secondary part 5. In the present embodiment, the two parts are tuned to a frequency of about 45 kHz. For transferring power, the receiver coil 6 is to be situated in the primary field 10 generated by the transmission coil 4 of the primary part 3, that means that the receiver coil 6 of the secondary part 5 is to be positioned within the primary field 10. The superposition of the primary field 10 and a secondary field due to induced currents in the secondary part defines the power transfer field. It is to be noted, that the primary part 3 and the secondary part 5 can also include ferrite cores to define a magnetic flux path. It is then, for example, possible that the receiver coil 6 is not directly positioned in the primary field 10. It needs however to lie in a common magnetic flux path between the primary part and the secondary part, defined by the ferrite core(s).

In an active area (respectively in the power transfer area) of the transmission coil, specifically on the top of the housing respectively enclosure comprising the transmission coil, a sense coil mat 11 is arranged, which comprises the sense coils (not shown) of the inventive sensor arrangement. A first and a second foreign object 12, 13 are located on the upper surface of the sense coil mat 11 in the active region of the sensor arrangement. Both foreign objects 12 and 13, made out of an electrical conductive material can be detected independently. The inventive FOD also allows determining the position of the foreign objects, as each detection cell can be evaluated separately.

The primary part 3 is supplied with power by a charging controller 14. A wire 15 connects the charging controller 14 with the primary part 3. The connection between the sense coil mat 11 and the primary part is not shown in FIG. 1.

The foreign objects 12 and 13, which are located in the active region of the primary pad 3, can be heated very intensely by eddy currents due to the time varying magnetic field caused by the coil of the primary part. The foreign object detection device allows the detection of the foreign objects 12 and 13 and can adapt the power transfer between the primary part 3 in the secondary part 5 due to the presence of the foreign objects 12 and 13, e.g. by adapting the exciting current of the primary part.

Figure 2:
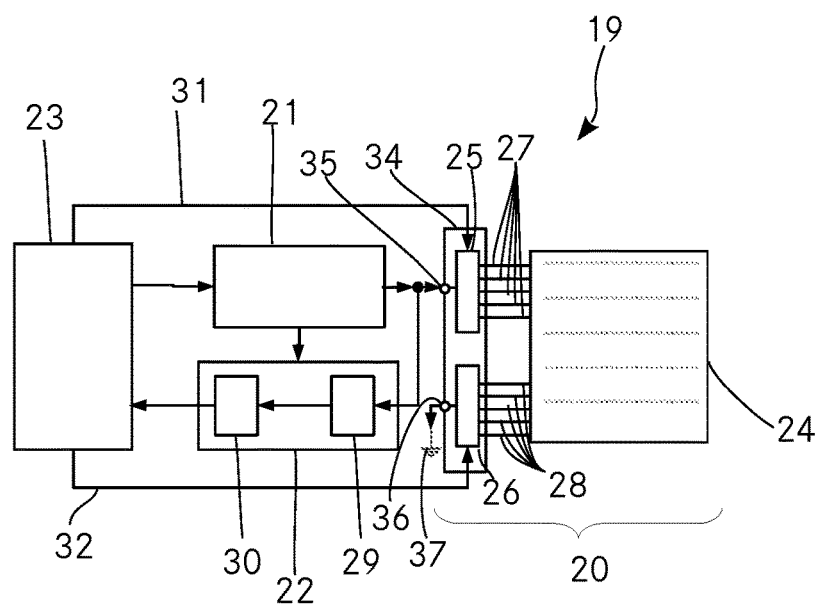
FIG. 2 a simplified block diagram of an embodiment of the inventive foreign device.

FIG. 2 shows a simplified block diagram of an inventive embodiment of FOD. The FOD (19) includes the inventive sensor arrangement 20, a stimulation unit 21, a measuring unit 22 and a signal processing and control unit 23. The sensor arrangement 20 comprises a sense coil mat 24 with a PCB as a support structure, a detection cell selection circuit 34 with a first multiplexing unit 25 as input selection circuit and a second multiplexing unit 26 as output selection circuit. The sensor arrangement 20 comprises one current input 35 and one current output 36.

The first multiplexing unit 25 is a demultiplexer with one input and five outputs. The outputs of the demultiplexer are connected to the input leads 27 of the sensor arrangement 20. The input of the demultiplexer is connected to the current input 35 of the sensor arrangement 20. The second multiplexing unit 26 is a multiplexer with five inputs and one output. The inputs of the multiplexer are connected to the output leads 28 of the sensor arrangement 20, the output of the multiplexing unit 26 is connected to current output 36 of the sensor arrangement 20, which is connected to the ground 37.

Each of the detection cells can be selected by means of the two multiplexing units 25, 26. The output of the stimulation unit 21 is connected to the input of the demultiplexer (respectively of the first multiplexing unit 25). A filter input of a band-pass filter 29 of the measurement unit 22 is connected to the current input 35 of the sensor arrangement 20. The measurement unit 22 further comprises an Analogue-to-Digital-Converter (ADC) 30, which is connected to the output of the band-pass filter 29. The pass-band of the band-pass filter includes the resonant frequencies of resonant tanks of the detection cells of the sensor arrangement, here having a frequency of about 900 kHz. The stop bands eliminate frequencies related to the operating frequency of the power transfer field, which is here 45 kHz.

The band-pass filter 29 is optional and also may be replaced by a high pass-filter. In addition or instead the band-pass filter 29, the measurement unit 22 can also include a signal conditioning module, for instance in order to scale the signal or convert the signal.

The signal processing and control unit 23 is connected with its input to the output of the ADC converter 30. It also has a row selection control output 31 being connected to the first multiplexer unit 25, a column selection control output 32, being connected to the second multiplexer unit 26, and a trigger control output 33, being connected to the input of the stimulation unit 21.

The signal processing and control unit 23 includes a microcontroller, e.g. a digital signal controller, an FPGA and/or an ASIC. The function of the microcontroller can be implemented by means of an FPGA and/or an ASIC. The signal processing and control unit 23 comprises a storage for the sampled data acquired by means of the ADC 30. It preferably comprises a means, which allows reconstructing the stimulation signal, as for instance a storage for the time stamps of the trigger events of the stimulation signals. Alternatively, the measurement unit 22 can include another signal channel for the acquisition of the stimulation signal. The signal processing and control unit 23 then also comprises a data storage for the acquired samples of the stimulation signal.

The signal processing and control unit 23 is configured to calculate a parameter related to the series impedance of a selected detection cell, based on the sampled electrical signal and the stimulation signal, by means of a signal processing and control unit 23.

Figure 3:
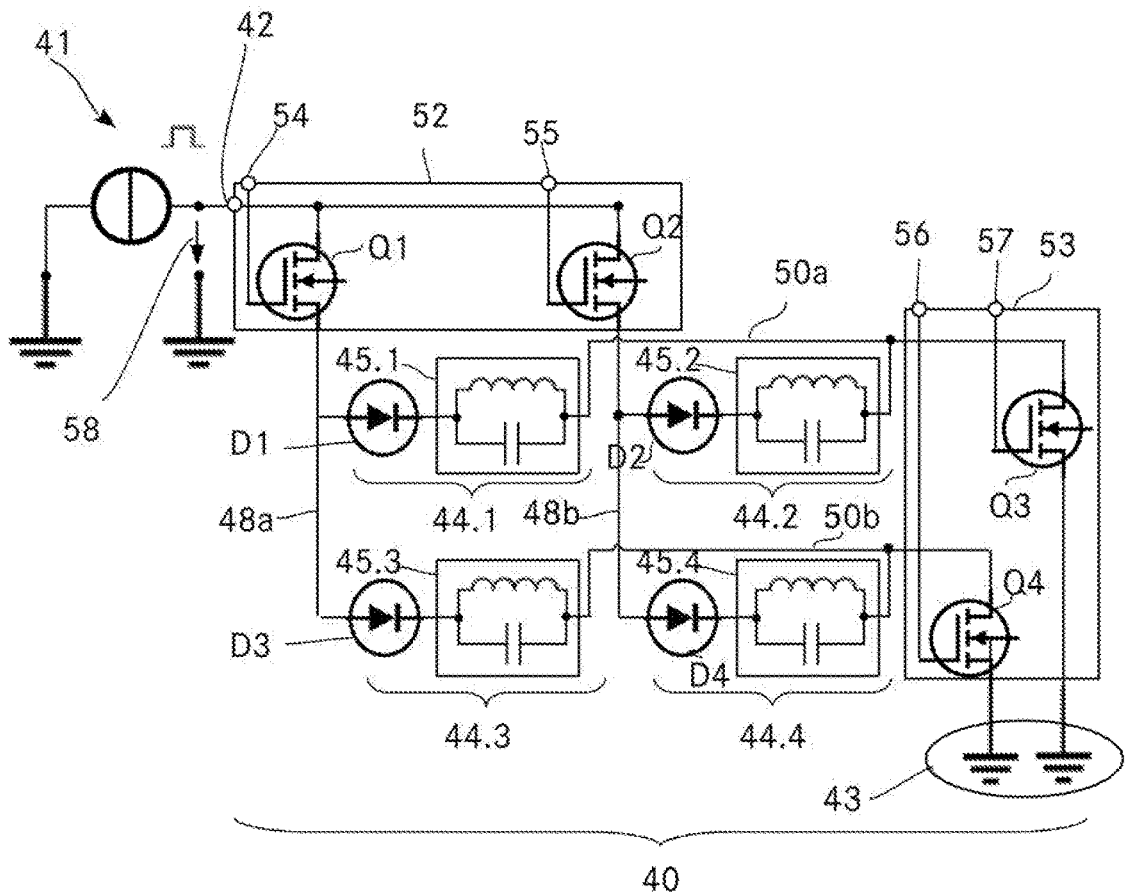
FIG. 3 a schematic circuit diagram of an embodiment of the inventive sensor arrangement together with the stimulation unit.

FIG. 3 shows a schematic circuit diagram of an embodiment of the inventive sensor arrangement 40 together with the stimulation unit 41. The sensor arrangement 40 includes a current input 42 and a current output 43, which is constituted by a ground connection. The current input 42 is connected to the output of the stimulation unit 41. The sensor arrangement 40 comprises four detection cells, namely the first detection cell 44.1, the second detection cell 44.2, the third detection cell 44.3 and the fourth detection cell 44.4, which are arranged in a matrix-like structure comprising two rows and two columns.

Each of the four detection cells 44.1, 44.2, 44.3 and 44.4 comprises a sense coil and a capacitor arranged in parallel, the sense coil and the capacitor forming a parallel resonant tank 45.1, 45.2, 45.3, 45.4.

Each of the detection cells 44.1, 44.2, 44.3 and 44.4 further comprises a diode D1, D2, D3, D4 being connected in series with its cathode to a first terminal of the parallel resonant tank 45.1, 45.2, 45.3, 45.4 of the respective detection cell 44.1, 44.2, 44.3 and 44.4.

The first detection cell 44.1 and the second detection cell 44.2 are part of the first row, while the third detection cell 44.3 and the fourth detection cell 44.4 are part of the second row. A first input lead 48a is connected to the anode of the diode D1 of the first detection cell 44.1, which is part of the first row and to the anode of the Diode D3 belonging to the third detection cell 44.3, which is part of the second row. Likewise, a second input lead 48b is connected to the anode of the diode D2 of the second detection cell 44.2, which is part of the first row and to the anode of the Diode D4 belonging to the fourth detection cell 44.4, which is part of the second row. The detection cells belonging to the first row, namely the first detection cell 44.1 and the second detection cell 44.2, are connected with their second terminals of their parallel resonant tanks 45.1 and 45.2 to a first output lead 50a. Similarly, the detection cells belonging to the second row, namely the third detection cell 44.3 and the fourth detection cell 44.4, are connected with their second terminals of their parallel resonant tanks 45.3, 45.4 to a second output lead 50b.

The number of detection cells and the total number of input leads and output leads for this embodiment is four and therefore there are as many detection cells as input and output leads together.

The sensor arrangement further comprises an input selection circuit 52 including a first MOSFET transistor Q1 and a second MOSFET transistor Q2. The first MOSFET transistor Q1 is connected with its source to the first input lead 48a while the second MOSFET transistor Q2 is connected with its source to the second input lead 48b. The drains of both MOSFET transistors Q1 and Q2 are connected to the current input 42 of the sensor arrangement. By addressing either the first MOSFET Q1 or the second MOSFET Q2, a column of the 2×2 sensor matrix can be selected.

Further, the sensor arrangement 40 comprises an output selection circuit 53 including a third MOSFET transistor Q3 and a fourth MOSFET transistor Q4. The third MOSFET transistor Q3 is connected with its drain to the first output lead 50a. The fourth MOSFET transistor Q4 is connected with its drain to the second output lead 50b. Both MOSFET transistors Q3 and Q4 are connected with their sources to the current output 43 of the sensor arrangement 40, which in this embodiment is connected to the electrical ground. By addressing either, the third MOSFET transistor Q3 or the fourth MOSFET transistor Q4 a row of the 2×2-sensor matrix can be selected. As an example, if the first detection cell 44.1 is to be selected, the MOSFET transistors Q1 and Q3 have to be addressed.

The input selection circuit 52 as well as the output selection circuit 53 include two control inputs 54, 55, 56, 57 that are connected to the gates of the respective MOSFET transistors Q1, Q2, Q3, and Q4. By means of these control inputs 54-57 the different transistors can be addressed and therewith the detection cells be selected.

The stimulation unit 41 is configured to generate a rectangular current pulse, to stimulate an electrical oscillation in the parallel tank of the selected detection cell. It includes a current source and an internal switch, which is not shown in FIG. 3.

An excited electrical oscillation in a selected detection cell yields to an oscillating voltage between the current input 42 and the ground, respectively the current output 43, which can, for example, be sensed with an ADC being connected with its terminals between the current input and the ground.

Due to the diodes D1-D4, only the resonant tanks of the selected detection cells are stimulated by the rectangular stimulation signal. The sensed electrical signal at the current input 42 of the sensor arrangement 40, namely the voltage 58 across the current input 42 and the ground (and therefore the current output 43) is a result of the oscillating current of the selected detection cell only, under the condition that the stimulated oscillations from previous selected detection cells have decayed to zero.

Hence, the diodes D1, D2, D3 and D4 serve as decoupling elements.

Figure 4:
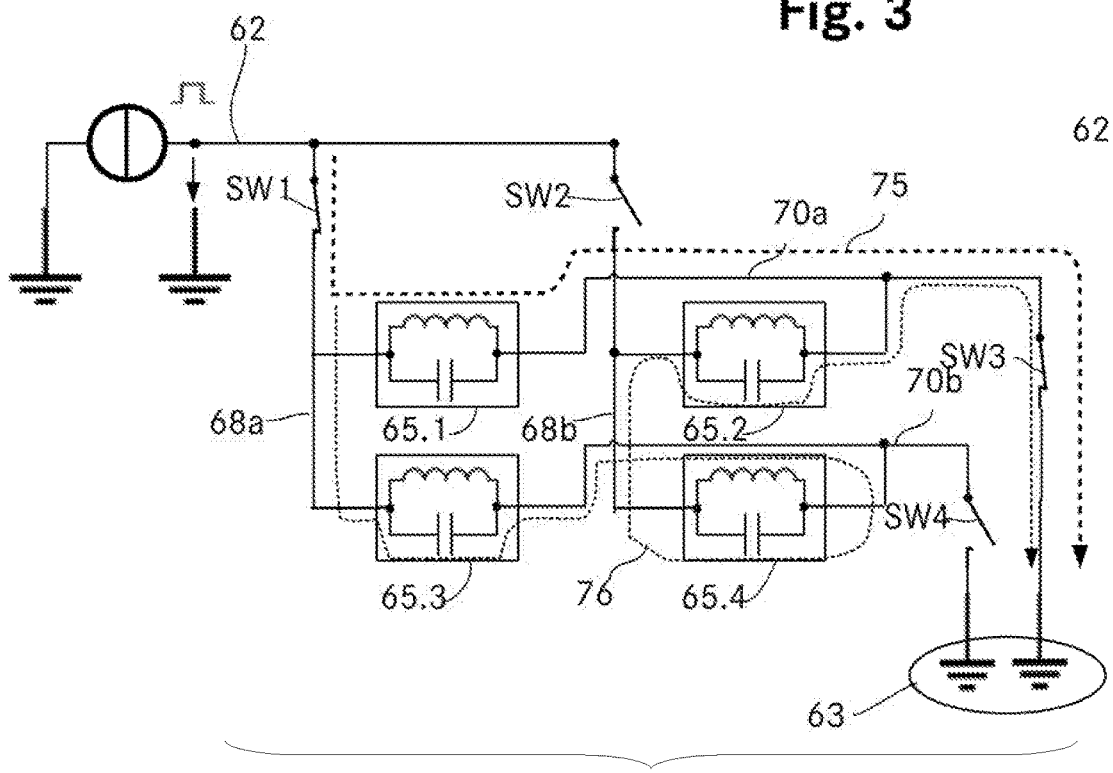
FIG. 4 a sensor arrangement without the inventive decoupling elements.

FIG. 4 shows a similar circuit as the circuit shown in FIG. 3. The sensor arrangement 60 of this circuit does however not include the decoupling diodes D1, D2, D3 and D4 of the inventive embodiment shown in FIG. 3 between the input leads 68a and 68b and the parallel resonant tanks, namely the first resonant tank 65.1, the second resonant tank 65.2, the third resonant tank 65.3 and the fourth resonant tank 65.4. The switches SW1, SW2, SW3 and SW4 in FIG. 4 correspond to the MOSFET transistors Q1, Q2, Q3 and Q4 of the embodiment shown in FIG. 3.

To select the first resonant tank 65.1 in the first row and first column of the sensor arrangement 60, the first switch SW1 and the third switch SW3 are activated and therefore closed, while the second switch SW2 and the fourth switch SW4 are opened. Thus, the closed first switch SW1 establishes an electrical connection between the current input 62 and the first input lead 68a and the closed third switch SW3 establishes an electrical connection between the first output lead 70a and the electrical ground respectively the current output 63. The selected resonant tank 65.1 is therefore in the direct current path 75 (indicated by the dashed line) between the current input 62 and the current output 63 of the sensor arrangement 60. However, there is also a parallel current path 76 (indicated by the dotted line) between the first input lead 68a and the first output lead 70a. This parallel path leads from the first input lead 68a over the third resonant tank 65.3 in a forward direction to the second output lead 70b. From there it continues over the fourth resonant tank 65.4 in reverse direction to the second input lead 68b and then over the second resonant tank 65.2 in a forward direction to the first output lead 70a.

This has the consequence that not only the first resonant tank 65.1 is stimulated in this switching state, but also the neighbouring cells 65.2-65.4. This yields to a cross talk between the different resonant tanks of the sensor arrangement. The measured voltage at the current input of the sensor arrangement becomes a function of the coupled oscillation in all four detection cells. Consequently, the sensitivity of the selected resonant cell is deteriorated and the evaluation of the stimulated time response becomes more difficult.

The diodes in the embodiment in FIG. 3 eliminate this effect. For the particular state, where the first detection cell 44.1 is selected by means of the transistors Q1 and Q3, the diode D4 blocks the rectangular shaped stimulation current, which would otherwise pass the fourth resonant tank in reverse direction, in the absence of the diode D4. Thus, only the selected detection cell is stimulated in the embodiment of FIG. 3.

Figure 5:
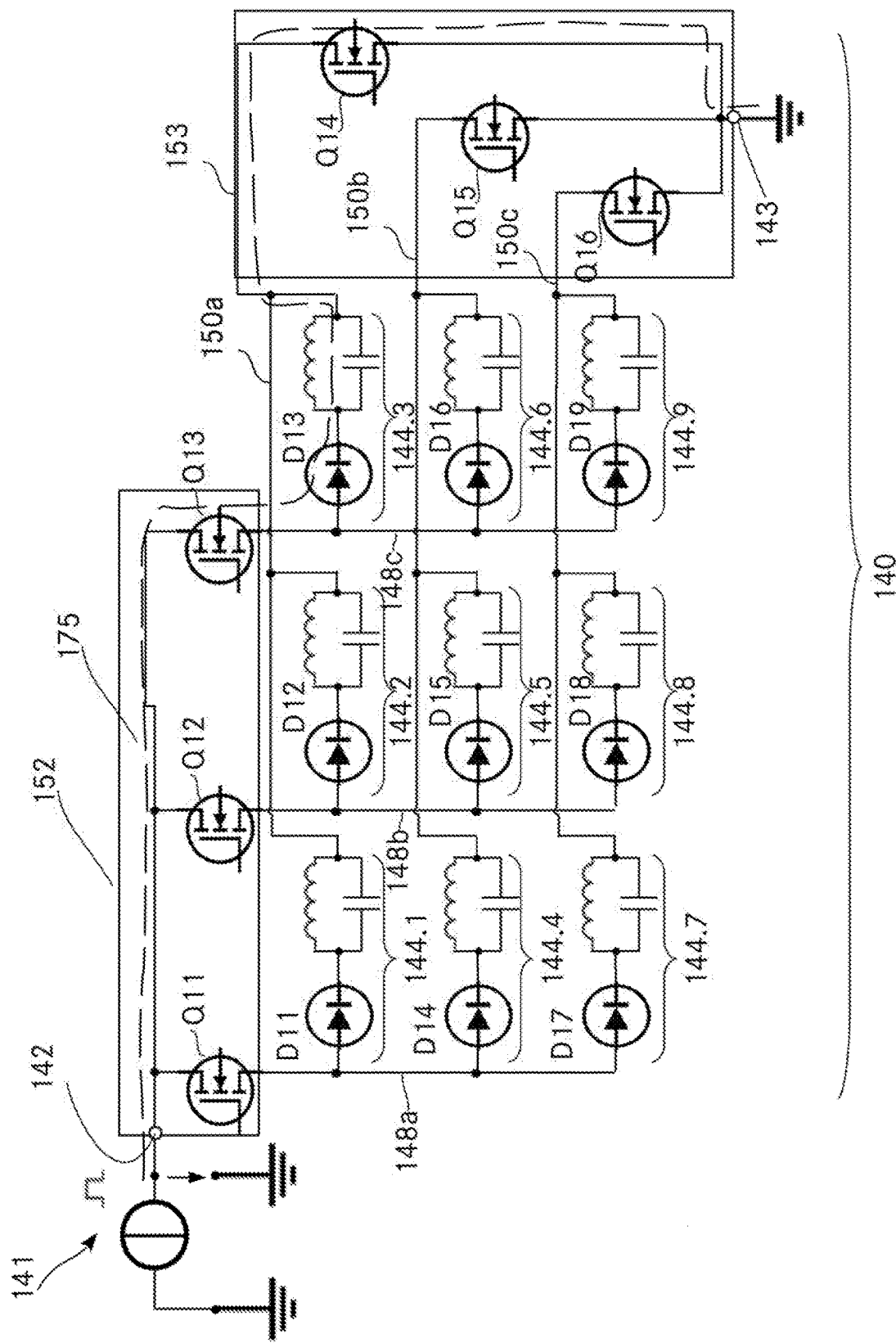
FIG. 5 a circuit diagram of an embodiment of the inventive sensor arrangement having parallel resonant tanks.

FIG. 5 shows a circuit diagram of further embodiment of the inventive sensor arrangement. The sensor arrangement 140 is similar to the sensor arrangement shown in FIG. 3, but comprises nine detection cells, which are arranged in a matrix-like structure comprising three rows and three columns. The detection cells 144.1-144.9 are identical as those in the embodiment of FIG. 3. They also include a parallel resonant tank and a diode as decoupling element, wherein the diode is connected in series with its cathode to the parallel resonant tank, the resonant tank comprising a sense coil and a capacitor.

The detection cells of the same row are connected to the same output lead while the detection cells of the same column are connected to the same input lead.

The first row includes the detection cells 144.1, 144.2 and 144.3. They are connected with their parallel resonant tanks to the first output lead 150a, which is connected to the MOSFET transistor Q14 of the output selection circuit 153.

The second row includes the detection cells 144.4, 144.5 and 144.6. They are connected with their parallel resonant tanks to the second output lead 150b, which is connected to the MOSFET transistor Q15 of the output selection circuit 153.

The third row includes the detection cells 144.7, 144.8 and 144.9. They are connected with their parallel resonant tanks to the third output lead 150c, which is connected to the MOSFET transistor Q16 of the output selection circuit 153.

The first column includes the detection cells 144.1, 144.4 and 144.7. They are connected with the anodes of their diodes D11, D14, D17 to the first input lead 148a, which is connected to the MOSFET transistor Q11 of the input selection circuit 152.

The second column includes the detection cells 144.2, 144.5 and 144.8. They are connected with the anodes of their diodes D12, D15, D18 to the second input lead 148b, which is connected to the MOSFET transistor Q12 of the input selection circuit 152.

The third column includes the detection cells 144.3, 144.6 and 144.9. They are connected with the anodes of their diodes D13, D16, D19 to the third input lead 148c, which is connected to the MOSFET transistor Q13 of the input selection circuit 152.

To select, for instance, the detection cell 144.3 in the first row and third column, the transistors Q13 and Q14 have to be activated, so that the detection cell 144.3 is a in direct current path 175 between the current input 142 and the current output 143 of the sensor arrangement 140. The diodes D14, D15, D17 and D18 block the stimulation current in the reverse direction through the respective detection cells 144.4, 144.5, 144.7 and 144.8 and prevent that the stimulation current can take a parallel path to the direct current path 175. Namely, in the absence of the diodes the following current paths would be possible:

From the third input lead 148c
 via the detection cell 144.6, the second output lead 150b, the detection cell 144.5 in reverse direction, the second input lead 148b, detection cell 144.2;
 via the detection cell 144.6, second output lead 150b the detection cell 144.4 in reverse direction, the first input lead 148a, detection cell 144.1;

via the detection cell 144.9—third output lead 150*c*—detection cell 144.8 in reverse direction—second input lead 148*b*, detection cell 144.2;

via the detection cell 144.9—third output lead 150*c*—detection cell 144.7 in reverse direction—first input lead 148*a*, detection cell 144.1;

to the first output lead 150*a*.

As those parasitic parallel currents are suppressed by the decoupling elements, namely the diodes D14, D15, D17 and D18, a rectangular stimulation current provided by the stimulation unit 141 only stimulates the selected detection cell, and not the neighboured resonant cells, wherefore the detection accuracy is increased.

Figure 6:
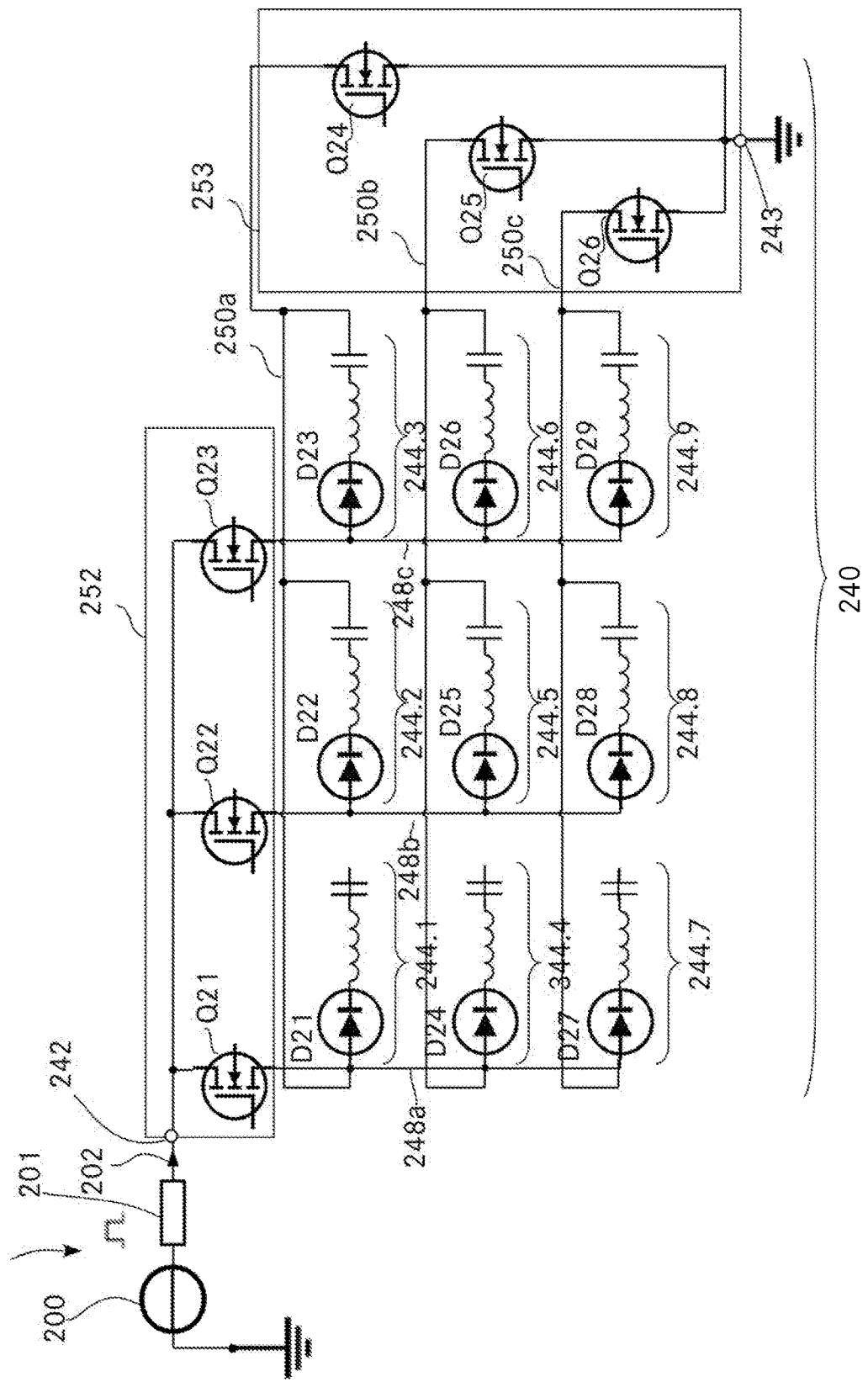
FIG. 6 a circuit diagram of another embodiment of the inventive sensor arrangement, having series resonant tanks.

FIG. 6 shows another embodiment of the inventive sensor arrangement. Similar to the sensor arrangement shown in FIG. 5, the detection cells 244.1-244.9 are arranged in a matrix-like structure comprising three rows and columns. In this embodiment however, each detection cell includes a series resonant tank instead of a parallel tank. Further, the stimulation unit 241 comprises a voltage source 200 for providing a rectangular voltage stimulation signal instead of a rectangular current stimulation signal. Further, the electrical sensing means is a current sensing means, which includes a shunt resistor 201, arranged between the output of the stimulation unit 241 and the current input 242 of the sensor arrangement 240. Alternatively, the input current 201 could also be determined at the current output 243 of the sensor arrangement, as the output current is identical to the input current. The diodes D21-D29, which are arranged between one of the input leads 248*a*, 248*b*, 248*c* and the series resonant tanks of the detection cells 244.1-244.9 have the effect as described in reference to the embodiment according to FIG. 5. They act as decoupling elements and avoid that the resonant tanks of not-selected cells are stimulated by the stimulation voltage, such that only the detection cell is stimulated which is selected by means of two of the six MOSFET transistors Q21, Q22, Q23, Q24, Q24, Q26.

Figure 7A:
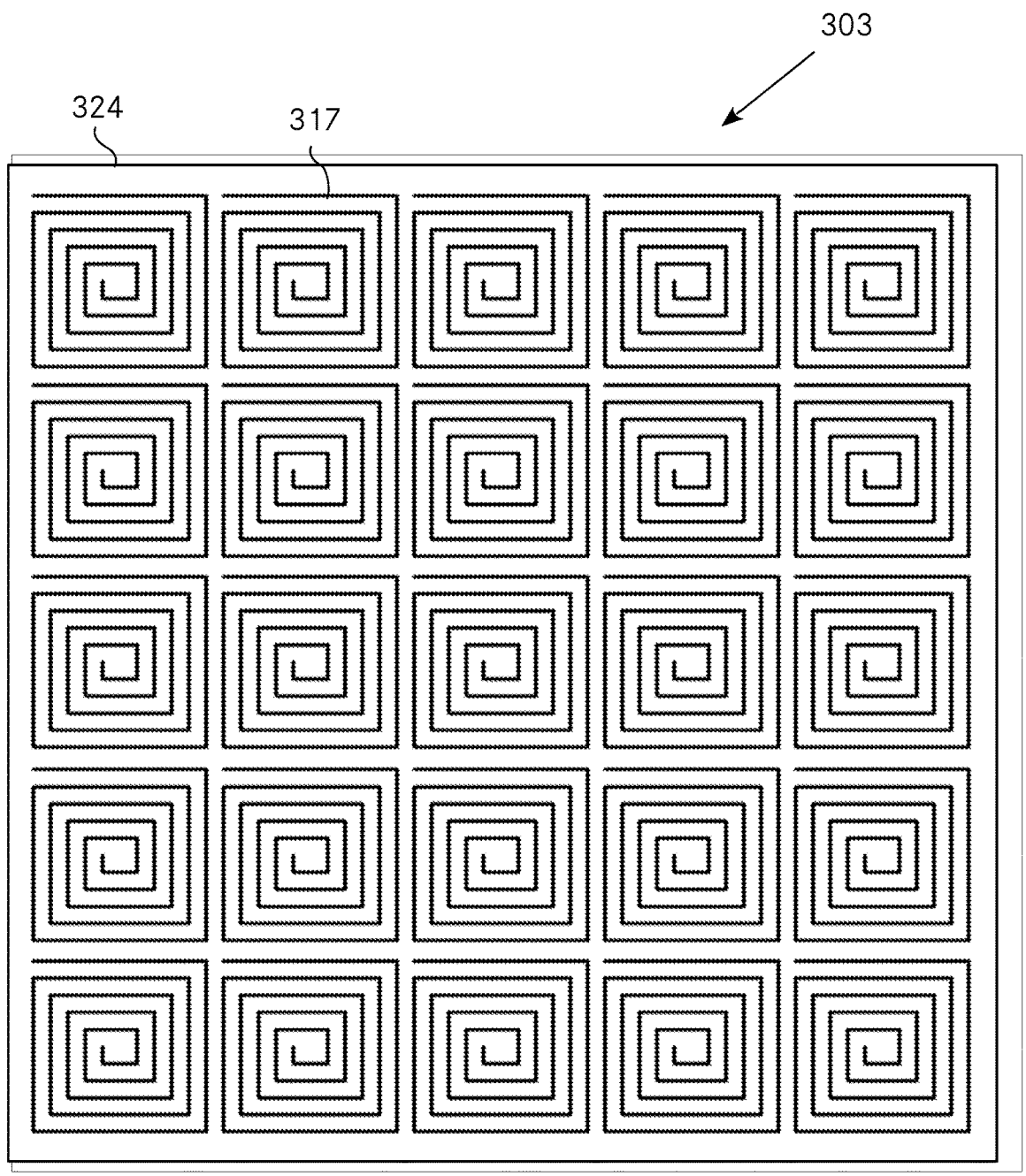
FIG. 7a a top view of a primary part of a wireless transfer system.
Figure 7B:
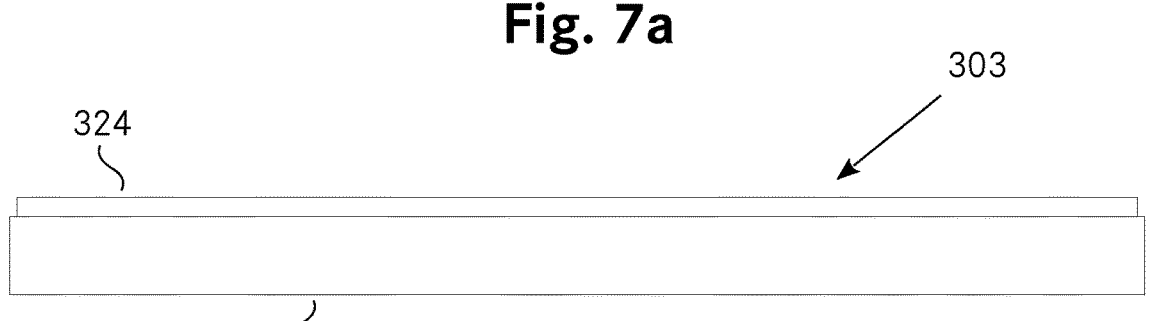

FIG. 7*a* shows a top view of a primary part of 303*a* wireless transfer system and FIG. 7*b* a side view of the primary part 303. It includes a foreign object detection device with a sense coil mat 324 arranged on the top of the housing 316 of the primary part 303. This sense coil mat 324 uses a PCB having a square-shaped surface. On this surface of the PCB, in a first layer, twenty-five sense coils 317 are printed. The sense coils 317 are arranged in a regular structure, namely a matrix-like structure with five rows and five columns. All sense coils 317 have the same shape, with a square outer shape and a side length of 100 mm. Each sense coil therefore has a detection area of 10,000 mm$^2$. The total detection area defined by the twenty-five sense coils 317 is a square with sides of about 0.5 m in length. The windings of a single sense coil 317 are formed by straight conductor sections, which are linked in right angles to form a spiral with five winding turns. Neighboured winding turn of a sense coil are equidistantly spaced from another, the distance between neighboured windings being about 10 mm. The winding turns of a sense coil 317 thus exploit the whole area encircled by the outer winding, such that the winding turns are distributed over the whole encircled area. The leads or feed wires connecting the outer winding turn and inner winding turn of each sense coil 317 are not shown in FIG. 7*a*. It is to be considered that those wires may interfere with the sense coils and thus bother the detection. Also the line resistances of the feed wires respectively leads have to be considered as well as the contact resistances of the connectors to the stimulation and measurement unit. However, these resistances do not change when a foreign object is present. This is why this resistance can be added as a fixed part to the serious resistance in the equivalent circuit diagram. The same applies to the series inductance and inductance caused by the lead wire. Nonetheless, it is recommended to reduce this effect by using twisted pair wiring and to assign two pins of the connecter to each sense coil.

The capacitors and/or the diodes of the resonant tanks are preferably arranged close to the sense coils, in a second layer of the PCB, on the surface of the PCB opposite to the surface where the sense coils 317 of the first layer are arranged. In addition, other components of the FOD, such as the selection circuits, the stimulation unit, the measurement unit and/or the signal-processing unit can be integrated in the sense coil mat, however advantageously they are integrated in the housing of the primary part and/or in a separate housing. Instead of a PCB support structure also a flexible support structure can be used, for instance in a form of a foil. Due to the rectangular outer shape of the sense coils, they can be arranged very close to each other without large interspaces.

Figure 8A:
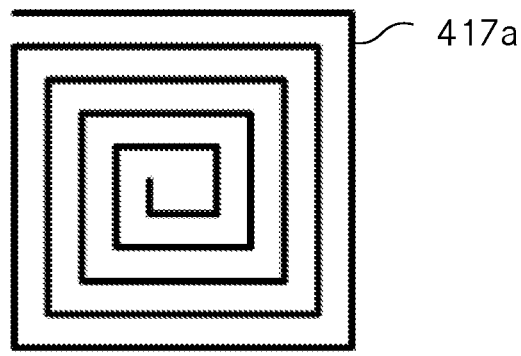
FIGS. 8a-8f different shapes of the sense coils.
Figure 8B:
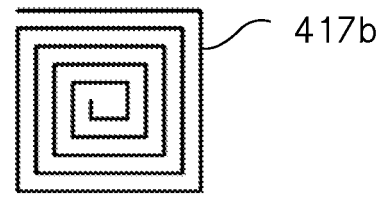
Figure 8C:
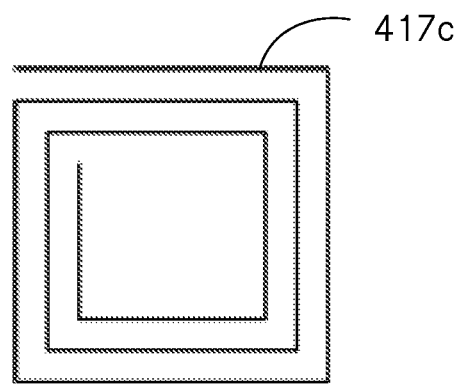
Figure 8D:
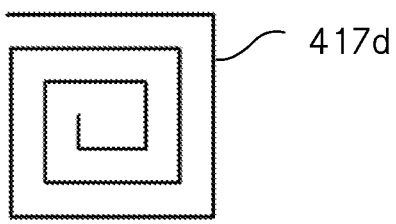
Figure 8E:
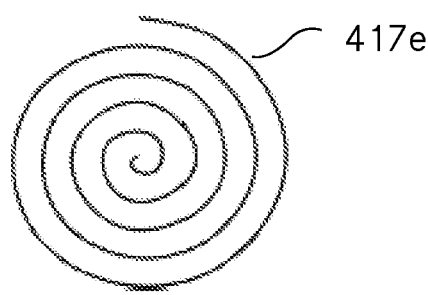
Figure 8F:
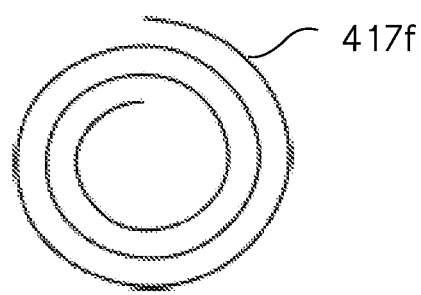

FIGS. 8*a*-8*f* show different preferred shapes of single sense coils. FIG. 8*a* shows a single square shaped sense coil 417*a* which is identical to the sense coil 317 in the embodiment in FIG. 7A. The sense coil 417*b* depicted in FIG. 8*b* has a similar form as the sense coil 417*a*, but a side length of 50 mm and a distance between two neighboured winding of 5 mm. The sense coil 417*c* depicted in FIG. 8*c* has the same outer shape as the sense coil 417*a*, shown in FIG. 8*a*, but only has three winding turns. As the distance between neighboured windings is also 10 mm, the inner space of the sense coil 417*c* is free of windings. FIG. 8*d* also shows a square-shaped sense coil 417*d*. This sense coil 417*d* has a side length of 60 mm and comprises three winding turns. Further, FIG. 8*e* shows a sense coil 417*e* which has a round outer shape and an outer diameter of 100 mm. The sense coil 417*e* has five winding turns. The distance of neighboured winding turns in this embodiment is also 10 mm. The winding turns are distributed over the whole detection area of the sense coil 417*e*. The sense coil 417*f* depicted in FIG. 8*f* also has a round outer shape with a diameter of 100 mm and a distance between neighboured windings of 10 mm, but comprises only three winding turns, such that the inner space of the detection area of this sense coil is free of winding turns.

By means of the size, shape and the number of winding turns, the detection area and the inductance of the sense coil can be adapted.

Figure 9:
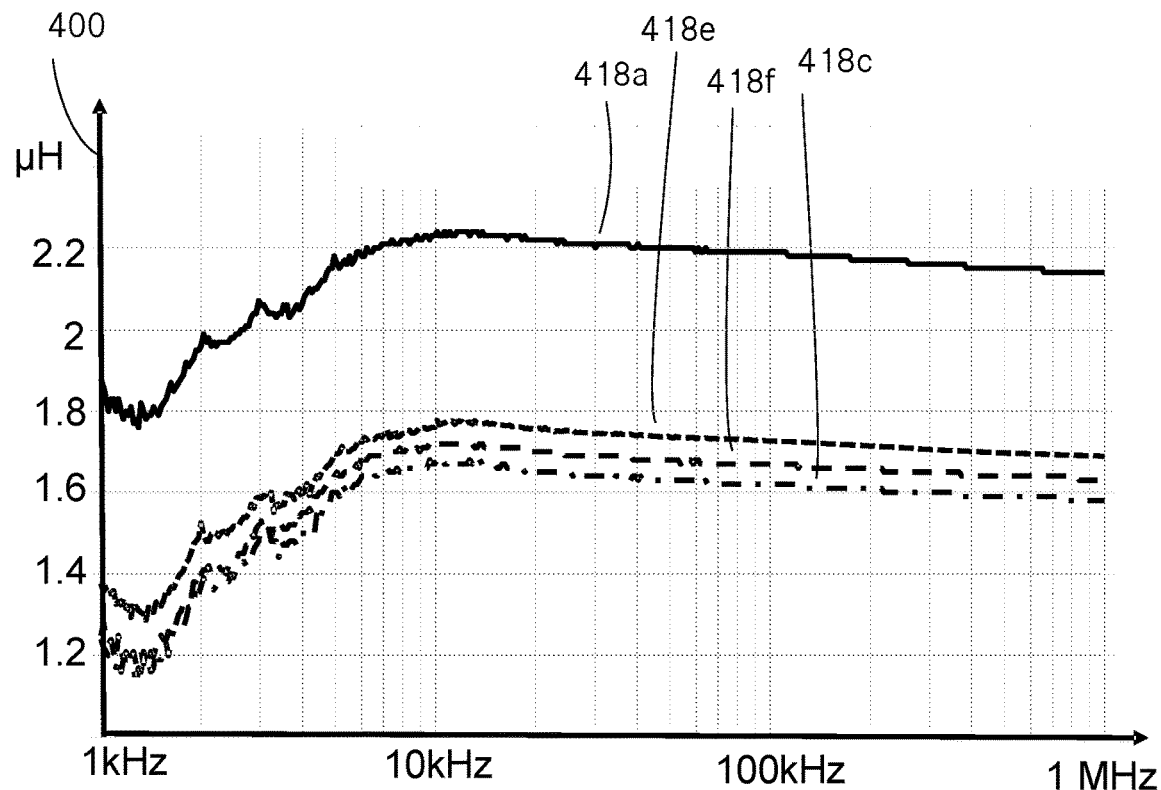
FIG. 9 a graph showing plots of the measured inductance against frequency for four different sense coils shapes.

FIG. 9 illustrates the dependency of the inductance 419 against frequency for four of the sense coils shapes 417*a*, 417*c*, 417*e*, 417*f*, shown in FIGS. 8*a*, 8*c*, 8*e*, 8*f*, over a frequency range from 1 kHz to 1 MHz. The measured inductances are not constant over the whole frequency due to parasitic effects. All measurements have their maximum inductance at a frequency of approximately 10 kHz. The measured inductance 418*a* (full line) of the squared-shape sense coil 417*a* depicted in FIG. 8*a* has a maximum inductance of 2.25 µH. This is significantly higher than the maximum of the measured inductance 418*e* of the round-shaped sense coil 417*e*, with about 1.8 µH. The measured inductance 418*c* of the squared-shape sense coil 417*c*, shown in FIG. 8*c*, which has the same outer shape as the sense coil 417*a*, but only 3 winding turns, has the lowest maximum inductance of all four coils, with about 1.65 µH. The inductance 418*f* of the round-shaped sense coil 417*f*, depicted in FIG. 8*f*, having the same outer shape as the also round-shaped sense coil 417*e*, but only three winding turns, has a maximum inductance of 1.7 µH, which is higher than the maximum inductance of the corresponding squared-shape sense coil 417e.

Figure 10:
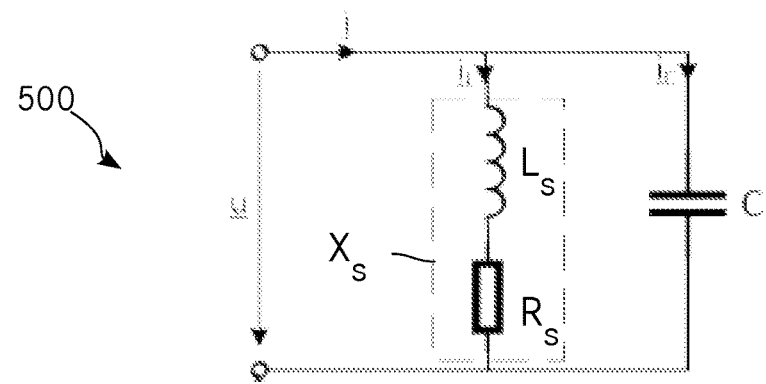
FIG. 10 a simplified equivalent circuit of a parallel resonant tank of a detection cell.

FIG. 10 shows a simplified equivalent circuit 500 of the resonant tank of a parallel detection cell. A foreign object can be detected by means of a change of parameters caused by the presence of a foreign object in the detection area of the selected sense coil. The simplified equivalent circuit comprises a series impedance $X_s$ with a series resistance $R_s$ and a series inductance $L_s$. The series resistance $R_s$ and the series inductance $L_s$ are connected in series. The series impedance $X_s$ is connected in parallel to the capacitance C of the detection cell. The series resistance $R_s$ contains all ohmic losses that occur in the sense coil and the foreign object, including conductive losses in lead wires and the different connections. Likewise, the series inductance $L_s$ includes in addition to the inductance of the sense coil the contribution of a possible present foreign object and the lead wires while the capacitance mainly includes the capacitance of the capacitor.

Figure 11:
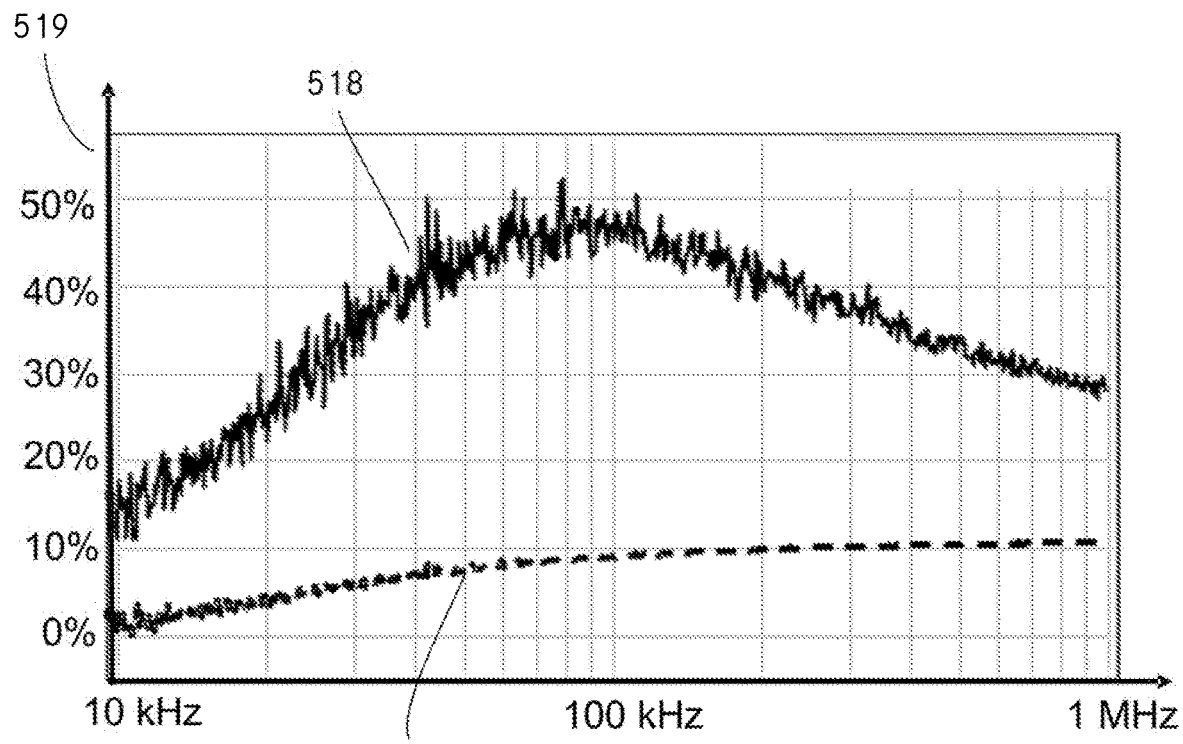
FIG. 11 a graph showing plots of a measured series resistance and a measured series inductance against frequency of a sense coil in the presence of a test object.

The graph in FIG. 11 shows plots of the series inductance 517 and the series resistance 518 of the squared-shape sense coil 417b (FIG. 8b), with five turns and a side length of 50 mm against frequency, for the case that a foreign object is present. The interaction is generated by a standardized aluminium foil test object, defined in the standard IEC 62368-1 [10.p.194ff]. For the specific sense coil 417b, used in the measurement, the value for series inductance is approximately 900 nH and the value for ohmic series resistance is about 100 mΩ, when no foreign object is present. The coordinate 519 shows the absolute changes of the series inductance and the series resistance in %, due to the presence of the test object compared to the case when no foreign object is present. Due to the eddy currents, the series resistance increases and the inductance decreases. It is seen, that the series resistant increases up to 48% and the series inductance decreases up to 11%.

The changes of those parameters can be used to detect the presence of the foreign object. In order to determine the parameters, the resonant tank can be stimulated by a stimulation unit, which generates—in the case of a sensor arrangement with parallel resonant tanks—a current step (input current) and applies it to a selected detection cell. The behaviour at the output of the detection cell then can be observed by measuring the voltage between the current input and the current output of the sensor arrangement. The time response of the voltage is also called step response.

The transfer function between the input current and the output voltage can be modelled, based on the simplified equivalent circuit 500, shown in FIG. 10:

$$G(s) = \frac{U(s)}{I(s)} = \frac{\frac{1}{C} + \frac{R_s}{sL_sC}}{s^2 + s\frac{R_S}{L_s} + \frac{1}{L_sC}}$$

The step response in time domain is:

$$u(t) = R_s - e^{-at} \cdot R_s \cos(2\pi f_o t) + e^{-at}\left(\frac{1}{C \cdot 2\pi f_o} - \frac{R^2}{2L_s \cdot 2\pi f_o}\right) \cdot \sin(2\pi f_o t)$$

This equation includes four summands. Three of the summands contain a product of the decaying exponential function $e^{-at}$, wherein a designates the decay rate, and a trigonometric function. Depending on the values $R_s$, $L_s$ and C, the oscillation dominates. There is a voltage offset, which is expressed by the first summand. This equation can further be simplified under the assumption that:

$$R_s \ll \frac{1}{C \cdot 2\pi f_o} \text{ and } \frac{R^2}{2\pi f_o \cdot 2L_s} \ll \frac{1}{C \cdot 2\pi f_o}, \text{ to:}$$

$$u(t) = e^{-at}\left(\frac{1}{C \cdot 2\pi f_o}\right) \cdot \sin(2\pi f_o t).$$

Figure 12:
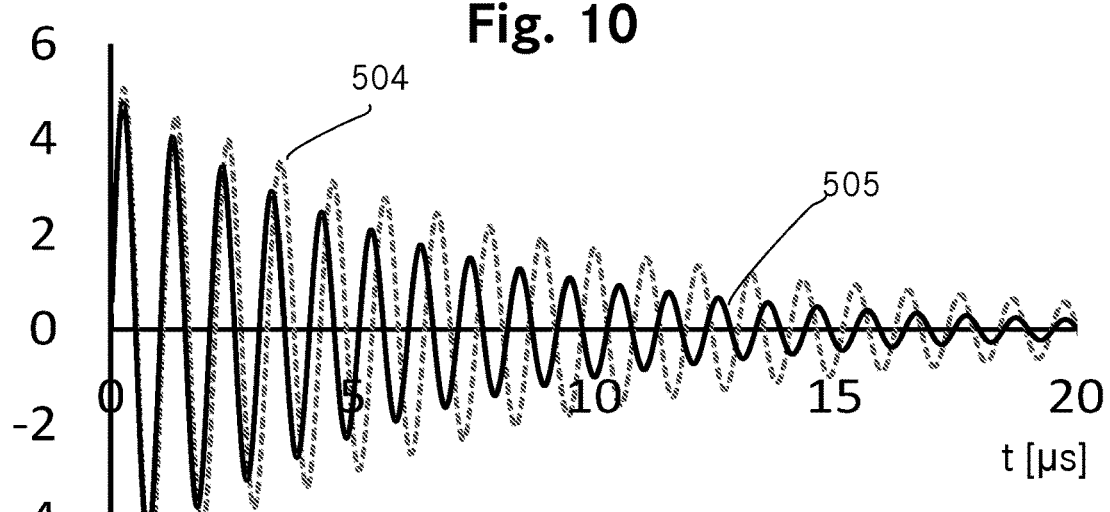
FIG. 12 a comparison of the step responses of a detection cell without and with the presence of a foreign object, the comparison being based on a simulation.

In FIG. 12 a first step response 504 and a second step response 505 of the voltage signal u(t) are depicted due to an current step i(t) of 1A applied at the input of the detection cell (respectively the equivalent circuit in FIG. 10). The first step response 504, drawn in a dashed line, represents the case where no foreign object is present. The second step response 505 drawn in a full line represents the case, when a foreign object is present. The simulation has been based on the following parameters:

|       | No foreign object is present | Foreign object is present |
|-------|------------------------------|---------------------------|
| $R_s$ | 200 mΩ                       | 258 mΩ (+29%)             |
| $L_s$ | 900 nH                       | 810 nH (−10%)             |
| C     | 33 nF                        | 33 nH                     |
| $f_o$ | 923 kHz                      | 942 kHz                   |
| a     | 11'100 $1/_s$                | 14'800 $1/_s$             |

It can be seen, that the resonant frequency and the decay rate are modified by the presence of the foreign object. These values can be easily determined by means of a signal-processing unit based on sampled data representing the time response. In particular, the measurement can be compared with previous measurements, e.g. a calibration measurement. Such it is possible to compensate for influences, which are related to the detection device and the wireless transfer system itself, in particular, the primary part. These influences might be caused e.g. by variations of the components used of the detection cells and also relate to an interference of the electromagnetic field caused by the detection cell with other parts of the FOD or the primary part. These parts also may comprise electrical conducting components, which themselves might be subjected to eddy currents caused by the stimulated oscillation in the detection cell. It is however also possible to compensate for environmental changes, due for instance to a change in the ambient temperature.

Figure 13:
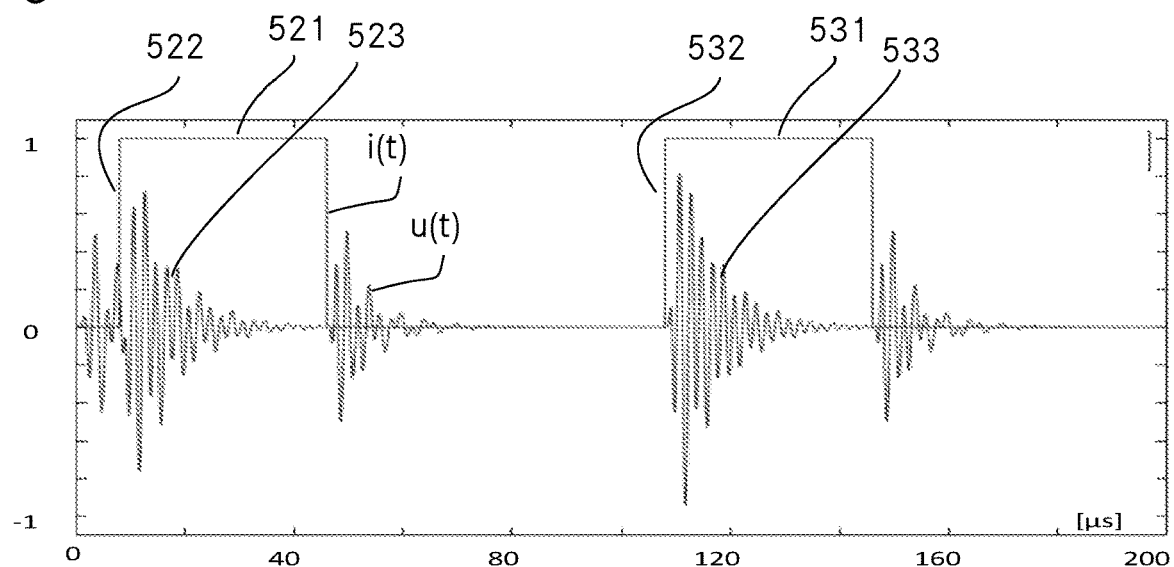
FIG. 13 a graph showing sampling data of the step responses of two consecutively selected detection cells.

FIG. 13 shows acquired sampling data of the stimulation current i(t) and voltage response u(t) due to the stimulation current i(t) at the current input of the sensor arrangement. The measurement has been taken continuously for two consecutively selected detection cells and the sampling data has been acquired by means of a single measurement unit including two ADCs.

After the first detection cell has been selected, a first rectangular current pulse 521 is generated by the stimulation unit, having a duration of approximately 40 µs. With its rising flank 522 the rectangular current pulse 521 stimulates an oscillation in the selected detection cell, yielding to the damped oscillating voltage signal 523, having an oscillation frequency of about 450 kHz.

After about 100 µs, a second detection cell is selected and a second rectangular current pulse 531 is generated by the stimulation unit, which is identical to the first current pulse 521. With the rising flank 532, the second rectangular current pulse 531 stimulates an oscillation in the now selected second detection cell, yielding again to a damped oscillating voltage signal 533. The voltage signal u(t) is filtered with a bandpass having a lower cut-off frequency significantly lower than the resonant frequency of the detection cell, but also significantly higher than the operating frequency of the transmission coil, which is about 50 kHz, in order to eliminate the influence of the power transmission field. The measurement shown above can be repeated for all detection cells of the sensor arrangement. In a preferred embodiment, the oscillating voltage signals 525 and 535 are acquired for a fixed timeframe, which is triggered by the respective rising flank 521, 531 of the stimulation signal i(t). The duration of the timeframe is preferable not exceeding the length of the rectangle pulse, such that that the evaluated signal corresponds to a step response. Preferably, the length of the rectangular pulse is chosen such that the stimulated oscillating voltage signal can decay to a large extend during the duration of the rectangular pulse.

It is also possible to choose the timeframe that it includes an entire rectangular pulse 521 or multiple rectangular pulses. Certainly, also other stimulation signals than rectangular pulses can be chosen, e.g. a single pulse of any shape, such as a triangular pulse. Also a predefined noise signal can be applied, such as a pseudo-random noise signal, in particular a white noise signal.

Figure 14:
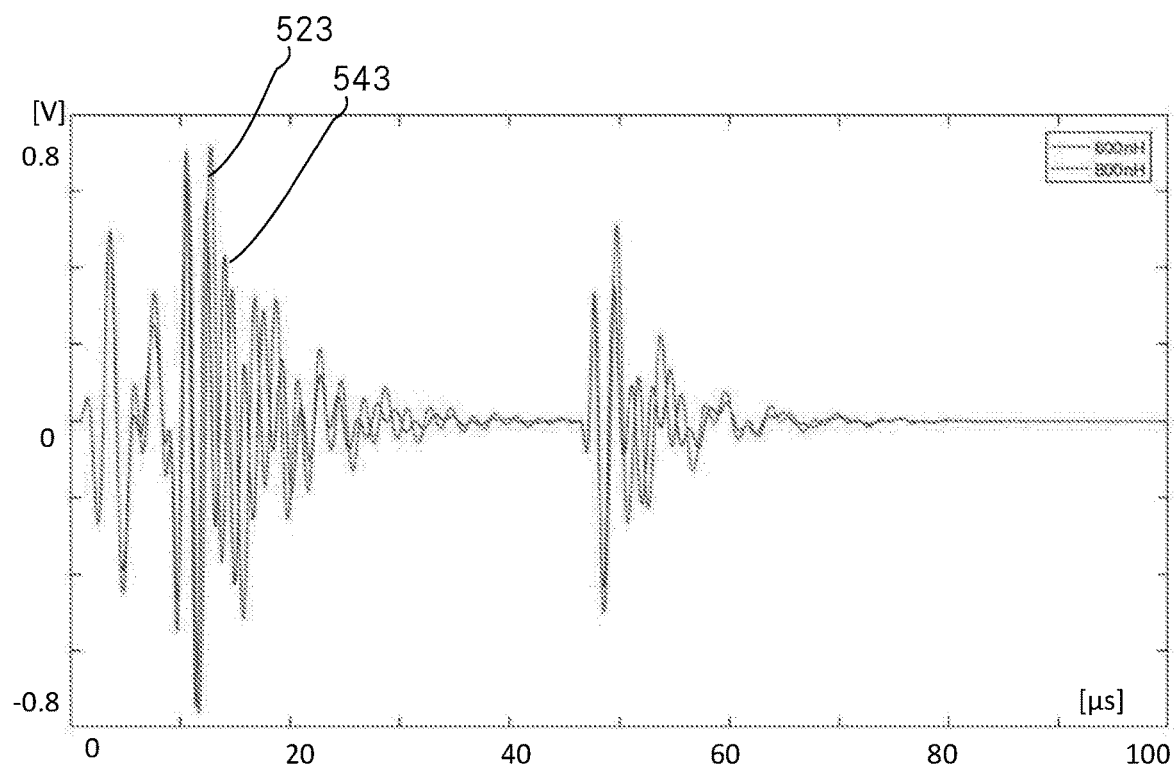
FIG. 14 a graph showing superimposed sampling data of two step responses of the same detection cell.

FIG. 14 shows superimposed plots of acquired data of the voltage response u(t) for two measurements, which have been taken with the same detection cell, but under different conditions. The first plot shows the measurement of a damped oscillating voltage signal 523, which has been taken when no foreign object has been in proximity to the detection cell. The second measurement is the plot of the damped oscillating voltage signal 543, which has been taken when a foreign object has been in proximity to the detection cell. This damped oscillation signal 523 is the same as the damped oscillating signal 523, already depicted in FIG. 13, being caused by the first rectangular pulse 521 (FIG. 13). It is seen that there is a slight increase of the oscillation of frequency due to a decrease of the serial inductance from 800 nH to 600 nH due to the presence of a foreign object.

Figures 15, 16:
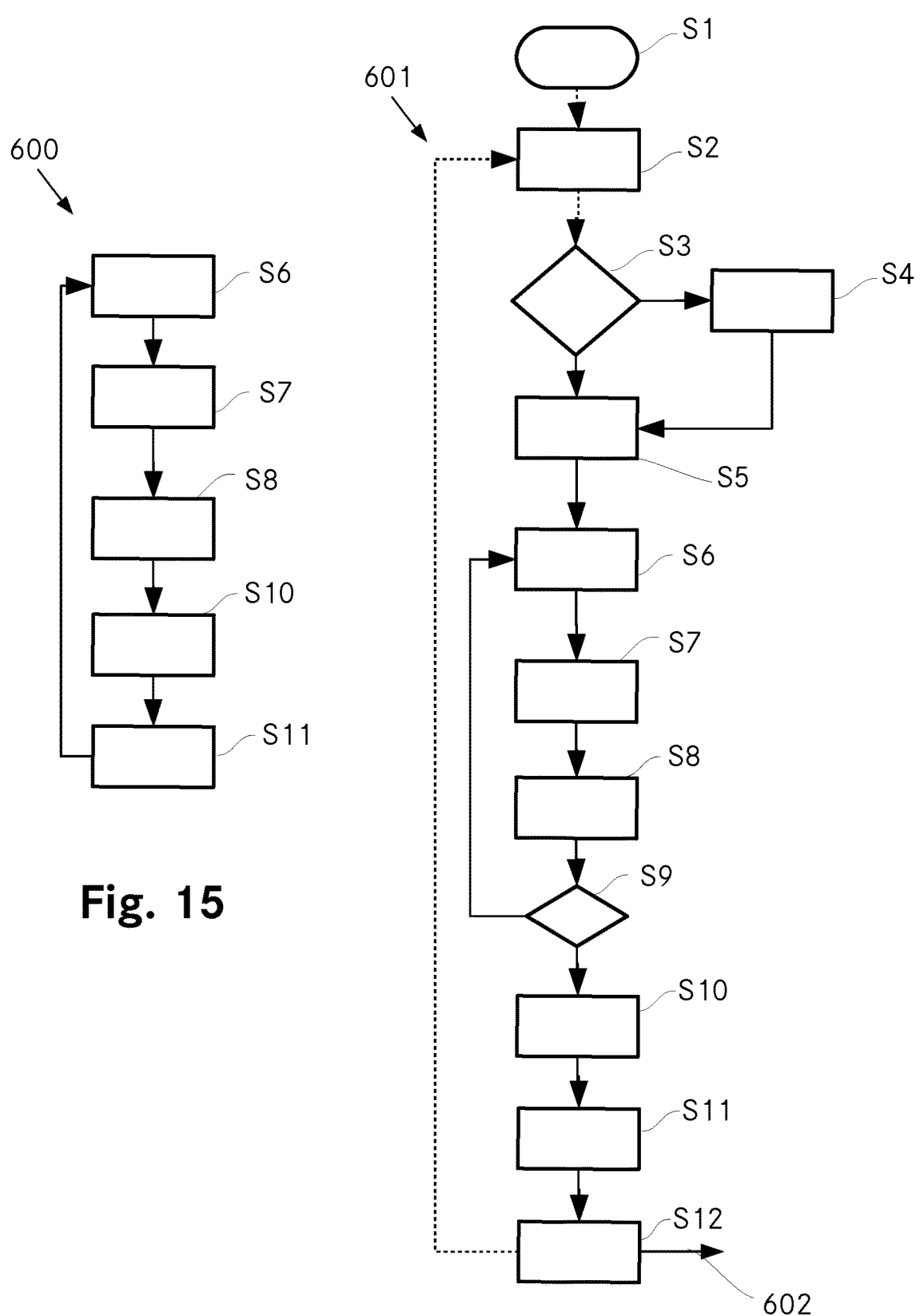
FIG. 15 a flow diagram showing a first embodiment of the inventive method.
FIG. 16 a flow diagram showing a second embodiment of the inventive method.

FIG. 15 shows a flow diagram 600 of an embodiment of the inventive method for detecting foreign objects by using the inventive FOD, such as for instance depicted in FIG. 2. The method allows detecting the presence of foreign objects in proximity of one or more detection cells of the sensor arrangement.

In the first step S6, a detection cell is selected by means of the input selection and the output selection circuit. Once that a detection cell is selected, in step S7 a stimulation signal is generated by the stimulation unit, to excite an oscillation in the selected detection cell. In step S8, the electrical signal representing the excited oscillation is sampled for a predetermined time. In the preferred case that the detection cells include parallel resonant tanks, the electrical signal is preferably the voltage between the current input and the current output of the sensor arrangement. In the step S10, the measurement signals acquired in step S8 are processed by the signal-processing unit and a parameter related to the series impedance of the selected detection cell is determined. In this embodiment the time response data of the selected detection cell is therefore represented by a single parameter. Once the parameter is determined, step S11 can be performed, wherein it is decided, based on the determined parameter, if a foreign object is present, respectively arranged in proximity to the previously selected detection cell. The steps S6-S11 can be repeated multiple times for all detection cells of the sensor arrangement.

FIG. 16 shows a flow diagram 601 of another embodiment of an inventive method for detecting foreign objects by using the inventive device. The method 601 includes the steps S1-S12. In step S1, the system is initialized. After the initialization, in step S2, a group of detection cells to be evaluated for the presence of a foreign object is selected. Preferably, the group includes all detection cell of the sensor arrangement.

In step S3, it is checked, if reference data for specific detection cells of the group of detection cells are required. This may be the case, if there is no reference data stored for the specific detection cell, if no calibration has been performed previously on this detection cell and/or if the reference data of the specific detection cell is out of date. It may also be the case, that a plausibility check, as discussed below in reference to step S11 has failed and therefore, a new calibration is required. It is also possible, that for one or more of the detection cells of the group no reference data is required at all. If there is at least one detection cell, requiring a reference data, then the step S4 is performed, wherein the required reference data for the detection cells are determined. Preferably, the reference data are updated for all detection cells during the calibration in step S4. The newly determined reference values in step S4 may also consider previously stored reference data.

Once the required reference data are determined, step S5 is executed, wherein the measurement unit starts data acquisition or at least arms the trigger for the data acquisition. In the following step S6, a detection cell is selected by means of the input selection and the output selection circuit. Steps S5 and S6 can also be executed simultaneously. Once the detection cell has been selected, in step S7 a stimulation signal is generated by the stimulation unit, to excite an oscillation in the selected detection cell. If the data acquisition is not already running, the stimulation signal or the excited oscillation triggers now the measurement.

During step S8, which provides for a waiting time with a predetermined duration, the electrical signal representing the excited oscillation is sampled. The waiting time is chosen such that the oscillating signal can decay to a sufficient low level. If the time has elapsed, the running measurement can continue or also be interrupted and the trigger be rearmed. Then in step S9 it is checked, if the measurement data has been acquired for all the detection cells of the group selected in step S2. If not, then the steps S6-S9 are repeated for the remaining detection cells of the selected group.

If data for all detection cells have been acquired, step S10 is executed, which stops the measurement. In the following step S11, the measurement signals are processed by the signal-processing unit. In this step the time response data for each previously selected detection cell is determined based on the samples of the electrical signal acquired in steps S6 to S9. The time response data may for instance include a series impedance, a series inductance or series resistance, a resonant frequency, a decay rate or also the raw sampled data.

In the next step S12, the time response data is compared to the reference data of the respective detection cell, or if this reference data does not exist, to a default value. Based on the comparison, it is determined if a foreign object is present or not. If a foreign object is detected, a control signal 602 for an indicating means or for controlling a wireless power transfer system is generated, e.g. to reduce or switch off a current in a transmission coil, and/or to prevent that the current in the transmission coil can be switched on. Further, the reference data can be adapted, e.g. to compensate for drifts due to environmental influences such as temperature variations. In addition, plausibility checks can be performed, using advanced signal processing methods known in the prior art.

The steps S2-S12 can be repeated for the same group of detection cells or for another group of detection cells. In a preferred case, the group selected in S2 only includes one detection cell.

Figure 17:
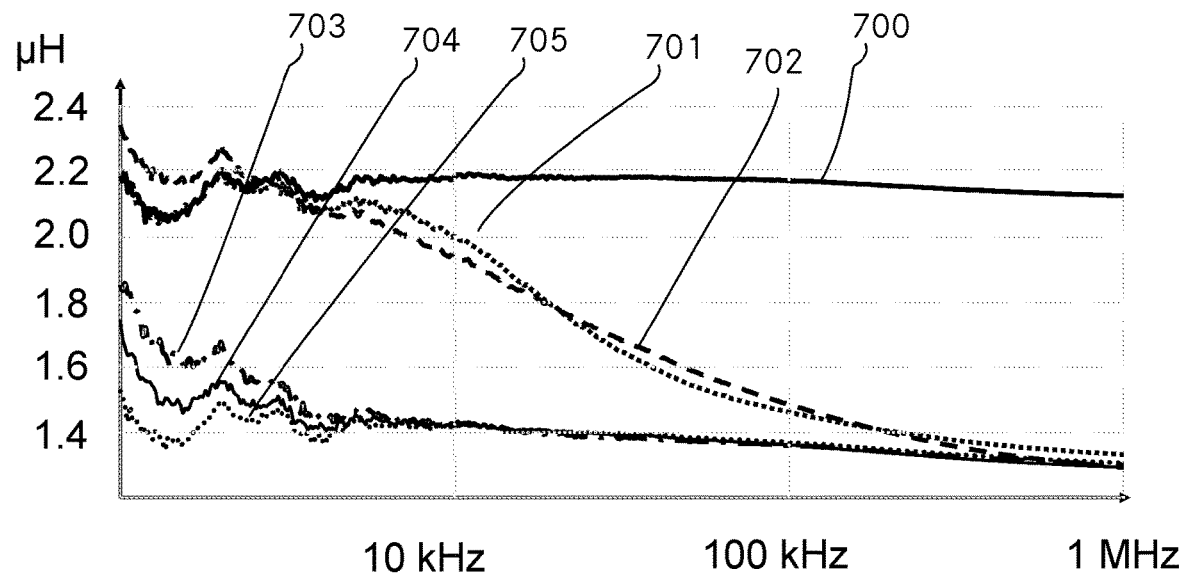
FIG. 17 a graph showing comparative plots of the series inductance of a sense coil against frequency in the presence of test objects made out of a different material.

FIG. 17 shows plots of the series inductance of the sense coil 417a (FIG. 8a) against frequency in the presence of different test objects, which are made out of different sheet material. All sheets have the same square-shaped base area with a side length of 70 mm. For comparison, plot 700 shows also the series inductance of the sense coil 417a in the absence of a foreign object.

Plot 701 depicts the series inductance in the presence of the steel sheet with a thickness of 0.8 mm, plot 702 the series inductance in the presence of a galvanized iron sheet, with a thickness of 0.5 mm, plot 703 the series inductance in the presence of a copper sheet with a thickness of 0.3 mm, plot 704 the series inductance in the presence of an aluminium sheet with the thickness of 1.5 mm, and plot 705 the series inductance in the presence of another copper sheet, having a thickness of 1.5 mm.

It is seen, that the presence of copper and aluminium test pieces already yields to a significant drop of the series inductance at low frequencies under 10 kHz. This is not the case for the steel and galvanized iron test sheet.

However, above a frequency over 100 kHz, in particular over 450 kHz, the values of the measured series inductance converge for all materials to the same value of 1.4 µH. This value corresponds to a drop in inductance of about 37% in reference to the condition, when no object is present. Hence, it might be advantageous to select a resonant frequency for the resonance tank of the detection cell over 100 kHz, in particular over 450 kHz.

Figure 18:
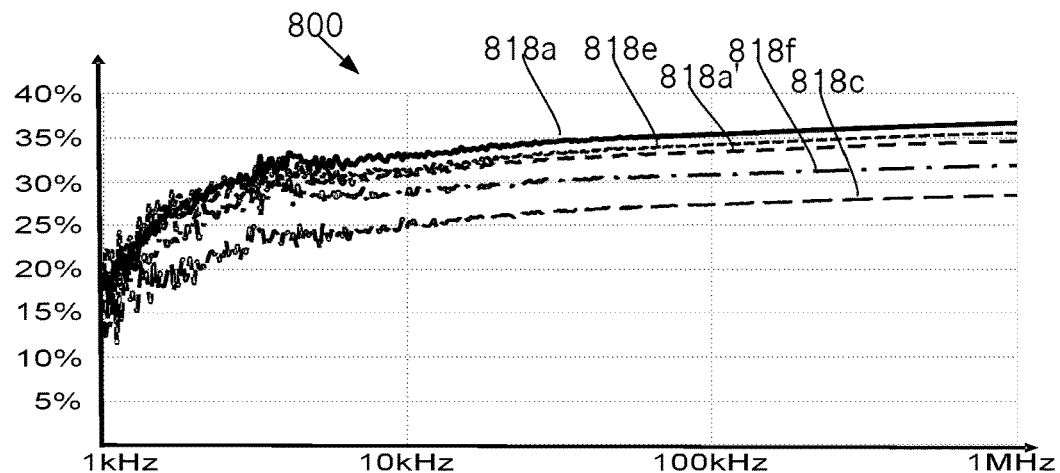
FIG. 18 a graph showing comparative plots of the series inductance of sense coils having different shapes against frequency in the presence of the same test object.

FIG. 18 illustrates the change of the series inductance against frequency for different sense coils, cause by the presence of a test object. As test object, the same copper sheet has been used as in the measurement described in reference to FIG. 17, having a square shape with a side length of 100 mm and a thickness of 0.3 mm. For the measurements, the test object is positioned directly in the centre of the respective sense coil. The y-axis of the graph 800 represents the percentage of the relative decrease of the series inductance in relation to the originally measured inductance in the absence of the test object (see FIG. 9).

FIG. 18 shows, that the relative decrease of the sense coil inductance caused by the test object for all tested sense coils is between 10% and 37%. Thus, all values clearly exceed a change of 3%, which is considered as limit to allow a reliable object detection Plot 818a shows that the square-shaped sense coil 417a (FIG. 8a) with five winding turns and the highest inductance, also has the highest change of inductance over the entire frequency range from 1 kHz to 1 MHz and reaches a maximum value of 37% at 1 Mhz. For the measurement, the sides of the test object have been arranged in parallel to the sides of the sense coil 417a.

Plot 818a' shows the measurement of change of the inductance of the same sense coil 417a, when the test object is arranged diagonally in respect to the sense coil 417a, what means, that the sides of the copper sheet are arranged in an angle of 45 degrees in respect to the windings of the sense coil 417a. The change of the inductance is slightly lower and reaches 34% at 1 MHz.

Figure 19:
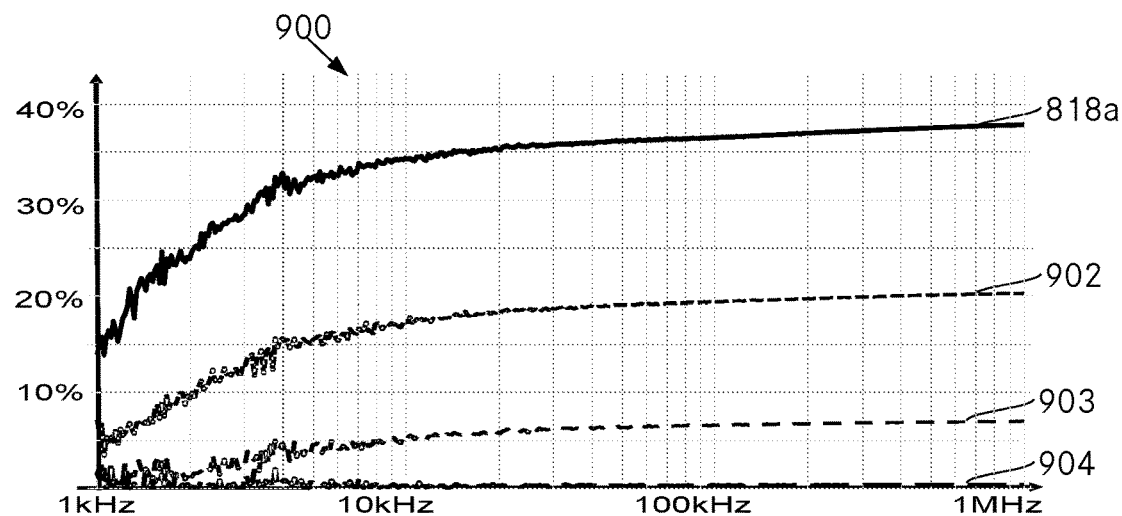
FIG. 19 a graph showing plots of the series inductance of a sense coil having a side length of 100 mm against frequency in the presence of test objects having different geometrical dimensions and FIG. 20 a graph showing plots of the series inductance of a sense coil having a side length of 50 mm against frequency in the presence of test objects having different geometrical dimensions.

The plot 818e shows that the inductance change of the round shaped sense coil 417e (FIG. 8e) with five winding turns lies between the two measurement plots 818a and 818a' and reached 36% at 1 MHz The sense coils having only three winding turns are subjected to a significantly lower change in the inductance. So the plot 818f shows the change of inductance of the round shaped sense coil 417f (FIG. 8f), which reaches at 1 MHz a value of 32%. Plot 818c shows the change of inductance of the squared shape sense coil 417c, which has the lowest change in inductance over the whole frequency range, with a maximum decrease of inductance of 26% at 1 MHz FIG. 19 illustrates that the change of inductance very much depends on the size of the foreign object, which is in proximity of the sense coil. Graph 900 shows the plots of measurements of the series inductance of the sense coil 417a in the presence of different square shaped copper sheets, in function of the frequency. Namely, plot 818a shows the change in series inductance in presence of the cover sheet having a side length of 70 mm (also depicted in graph 800 in FIG. 18). Plot 902 shows the change in series inductance in presence of a copper sheet having a side length of 50 mm, plot 903 the change in series inductance in presence of a copper sheet having a side length of 30 mm and plot 904 the change in series inductance in presence of a copper sheet of having a side length of 10 mm. For the smallest object with the side length of 10 mm, the change of inductance is below 3% and therefore cannot be reliably detected. However, already the copper sheet having a side length of 30 mm can be reliable detected above the frequency of 5 kHz, where it has a change in inductance of more than 3%.

Figure 20:
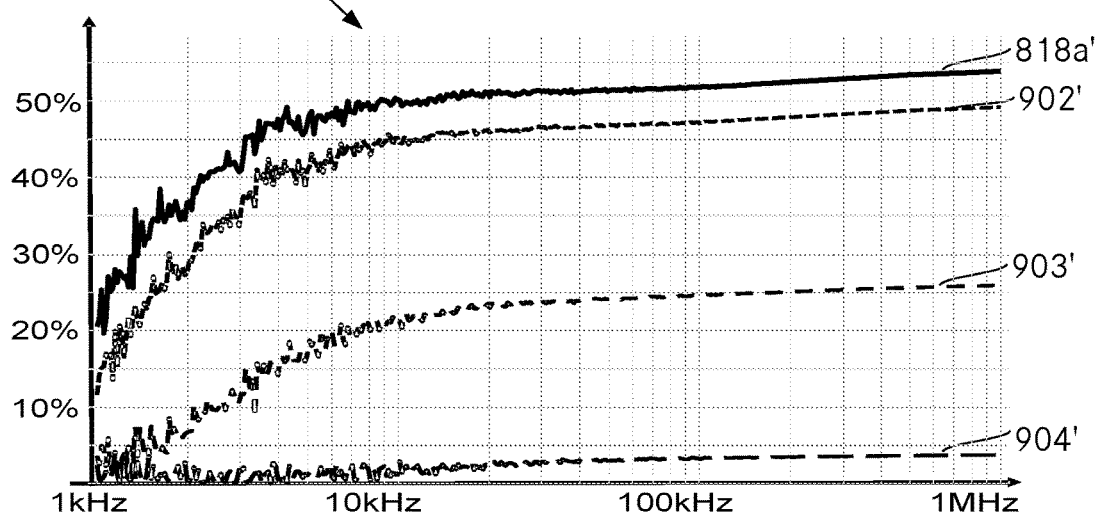

FIG. 20 shows, that the sensitivity respectively the relative change in inductance can be improved by scaling the sense coil. The plots in graph 1000 of FIG. 20 have been made with the same test objects as in FIG. 19, however by using the sense coil from 417b (FIG. 8b), having a side length of 50 mm. For the corresponding measurement plot, the same reference signs as in FIG. 19 are used, however with an apostrophe added at the end. It can be seen that the sensitivity increases for all test objects, in particularly for the small objects. In addition, the test object with the side length of 10 mm is now subjected to a decrease in series inductance of more than 3% for frequencies above 5 kHz and can now be detected. Hence, it may be advantageous to decrease the size of the sense coils.

It is further to be noted, that the detection sensitivity decreases with the distance between the foreign object to a sense coil. For the test object with a side length of 70 mm and for the sense coil 417c, at a distance of 10 mm, the decrease of the series inductance is only 10% at 1 MHz and at a distance of 20 mm only about 3% at 1 MHz, compared to 56% at a distance of 0 mm. For smaller sense coils and/or smaller objects, the decrease of the series inductance and therewith of the detection sensitivity drops even faster with an increasing distance. Thus, with smaller sense coils not only the complexity increases, as more detection cells are required for the same total detection area, the capability to detect more distanced object decreases. The decreased sensitivity of the sense coils having at larger distances has the advantage, that for many applications, where large air gaps are used for wireless power transfer, such as for charging of electrical vehicles, the presence of the secondary is of no concern for the foreign object detection. This is specifically the case of sense coils with a detection area of smaller than 22500 $mm^2$ and air gaps length over 100 mm.

The invention claimed is:

1. A sensor arrangement for a foreign object detection device used in a wireless power transfer system, comprising:
   a) a current input and a current output,
   b) a multitude of detection cells, each comprising a sense coil and a capacitive element, forming a resonant tank, wherein the sensor arrangement has a multitude of input leads and a multitude of output leads, the total number of input and output leads being equal or smaller than the number of detection cells, each detection cell being connected between one of the input leads and one of the output leads, in a way that each of the detection cells is connected to a different pair of input and output leads,
   c) the sensor arrangement further including an input selection circuit allowing to selectively establish an electrical connection between the current input and one or more of the input leads, and an output selection circuit allowing to selectively establish an electrical connection between one or more of the output leads and the current output, wherein at least one detection cell includes a decoupling element connected in series to its resonant tank.

2. The sensor arrangement according to claim 1, wherein the sense coils of the multitude of detection cells are arranged in a regular pattern, preferably in a matrix-like structure with multiple rows and columns.

3. The sensor arrangement according to claim 1, wherein the sense coils of the multitude of detection cells are arranged in one or more layers.

4. The sensor arrangement according to claim 3, wherein the sense coils of the different layers overlap each other.

5. The sensor arrangement according to claim 3, wherein the sense coils of the different layers have different sizes.

6. The sensor arrangement according to claim 1, wherein at least one sense coil of a detection cell has a spiral shape, and wherein turns of the sense coils of neighbouring detection cells of the detection cell have a distance between 0.1 mm and 10 mm.

7. The sensor arrangement according to claim 1, wherein a resonant frequency of the resonant tank of at least one sense coil of a detection cell is between 10 kHz 400 kHz, when no foreign object is arranged in proximity to the respective sense coil.

8. The sensor arrangement according to claim 1, wherein the sense coils of the detection cells have a rectangular or a square outer shape, the size of the sense coils being adapted to the size of the foreign object to be detected, wherein the detection area of a sense coil covers a surface between 100 and 10000 mm$^2$.

9. The sensor arrangement according to claim 1, wherein said one decoupling element includes a non-controlled reverse current blocking element, the reverse current blocking element being a diode, in particular a PN-junction diode or a Schottky diode.

10. The sensor arrangement according to claim 1, wherein the sense coil and the capacitive element of each detection cell are connected in parallel to form a parallel resonant tank.

11. The sensor arrangement according to claim 1, wherein the wireless power transfer system has a primary part that includes the sensor arrangement, wherein the wireless power transfer system is configured to 1) transfer power over an air gap to a nearby receiver and 2) generate a magnetic field in an active area at a transmission frequency, and wherein the sense coil of each detection cell is arranged in a way that a sensing area defined by the sense coil at least partly covers the active area.

12. The sensor arrangement according to claim 11, wherein the primary part is configured to adapt a current of a transmission coil of the primary part when a foreign object is detected.

13. The sensor arrangement according to claim 12, wherein the wireless power transfer is configured to wirelessly transfer electrical power from the primary part to a secondary part over the air gap and wherein the sense coil is at least partly positioned in the air gap between the primary part and the secondary part.

14. A foreign object detection device for a wireless power transfer system comprising:
   a) a sensor arrangement comprising:
      i) a current input and a current output, and
      ii) a multitude of detection cells, each comprising a sense coil and a capacitive element, forming a resonant tank, wherein the sensor arrangement has a multitude of input leads and a multitude of output leads, the total number of input and output leads being equal or smaller than the number of detection cells, each detection cell being connected between one of the input leads and one of the output leads, in a way that each of the detection cells is connected to a different pair of input and output leads, and wherein the sensor arrangement further includes an input selection circuit allowing to selectively establish an electrical connection between the current input and one or more of the input leads, and an output selection circuit allowing to selectively establish an electrical connection between one or more of the output leads and the current output, wherein at least one detection cell includes a decoupling element connected in series to its resonant tank;
   b) a stimulus circuit for generating a predetermined stimulation signal, connected to a current input of the sensor arrangement, the predefined stimulation signal preferably being a rectangular pulse,
   c) a measurement unit, adapted to sense an electrical signal applied to said current input, the measurement unit including an analogue to digital converter for acquiring sampling data representing the sensed electrical signal,
   d) a signal processing unit which is configured to determine time response data of a selected detection cell, based on the sampling data acquired by the measurement unit,
   e) wherein the measurement unit preferably includes a filter for filtering the electrical signal.

15. The foreign object detection device according to claim 14, wherein the sensor arrangement is configured to perform the steps of
   a) selecting a detection cell by means of the input selection circuit and the output selection circuit,
   b) generating a stimulation signal with the stimulation unit, to excite an oscillation in the selected detection cell, the stimulation signal preferably being a rectangular pulse,
   c) sampling with the measurement unit an electrical signal representing the excited oscillation in the selected detection cell,
   d) determine time response data of the selected detection cell by means of the signal processing unit, based on the samples acquired in step c), e) based on the time response data determined in step d), decide by means of a signal processing unit, if a foreign object is present close to the selected detection cell f) repeating the steps a-e, for other detection cells, preferably for all other detection cells.

16. The foreign object detection device according to claim 15, wherein the electrical signal is continuously acquired during the consecutive execution of steps a)-c) of claim 15 for more than one detection cell, before the steps d) to f) of claim 15 are executed for each of said detection cells, wherein step d) includes reducing a phase shift between the stimulation signal and the sampled electrical signal representing the excited oscillation in the selected detection cell by determining a cross-correlation between the stimulation signal and said sampled electrical signal representing the excited oscillation in the selected detection cell.

17. The foreign object detection device according to claim 15, wherein the decision if a foreign object is present close to a specific detection cell is made based on a comparison of the time response data with reference data specific to the respective detection cell, wherein the specific reference data preferably is continuously adjusted to consider environmental influences.

* * * * *